US012795132B2

(12) United States Patent
Li et al.

(10) Patent No.: US 12,795,132 B2
(45) Date of Patent: Nov. 10, 2026

(54) DISTORTION-BASED CODING TOOL DETERMINATION

(71) Applicants: Beijing Bytedance Network Technology Co., Ltd., Beijing (CN); Bytedance Inc., Los Angeles, CA (US)

(72) Inventors: Junru Li, Beijing (CN); Yue Li, Los Angeles, CA (US); Kai Zhang, Los Angeles, CA (US); Li Zhang, Los Angeles, CA (US)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 48 days.

(21) Appl. No.: 18/622,793

(22) Filed: Mar. 29, 2024

(65) Prior Publication Data

US 2024/0244239 A1 Jul. 18, 2024

Related U.S. Application Data

(63) Continuation of application No. PCT/CN2022/122346, filed on Sep. 28, 2022.

(30) Foreign Application Priority Data

Sep. 29, 2021 (WO) ................ PCT/CN2021/121977

(51) Int. Cl.
*H04N 19/42* (2014.01)
*H04N 19/117* (2014.01)
(Continued)

(52) U.S. Cl.
CPC ........... *H04N 19/42* (2014.11); *H04N 19/117* (2014.11); *H04N 19/132* (2014.11);
(Continued)

(58) Field of Classification Search
CPC .. H04N 19/117; H04N 19/132; H04N 19/147; H04N 19/176; H04N 19/42; H04N 19/80; H04N 19/82
See application file for complete search history.

(56) References Cited

U.S. PATENT DOCUMENTS 12,052,443 B2 * 7/2024 Chen ...................... H04N 19/82
2020/0186808 A1 * 6/2020 Joshi .................... H04N 19/159
(Continued)

FOREIGN PATENT DOCUMENTS

CN 111405283 A 7/2020
CN 111885280 A 11/2020
(Continued)

OTHER PUBLICATIONS

International Search Report in PCT/CN2022/122346, mailed Dec. 19, 2022, 6 pages.

*Primary Examiner* — Jessica M Prince
(74) *Attorney, Agent, or Firm* — Astute IP Law Group

(57) ABSTRACT

Embodiments of the present disclosure provide a solution for video processing. A method for video processing is proposed. The method comprises: determining, during a conversion between a target video block of a video and a bitstream of the video, a target coding tool for the target video block by using a machine learning model; and performing the conversion by using the target coding tool. By taking the machine learning model into consideration in selecting the coding tool, a more proper coding tool can be selected. In this way, the coding performance can be enhanced.

20 Claims, 17 Drawing Sheets

(51) Int. Cl.

| | |
|---|---|
| ***H04N 19/132*** | (2014.01) |
| ***H04N 19/147*** | (2014.01) |
| ***H04N 19/176*** | (2014.01) |
| ***H04N 19/80*** | (2014.01) |

(52) U.S. Cl.

CPC ......... *H04N 19/147* (2014.11); *H04N 19/176* (2014.11); *H04N 19/80* (2014.11)

(56) References Cited

U.S. PATENT DOCUMENTS

| | | | | |
|---|---|---|---|---|
| 2020/0244997 | A1* | 7/2020 | Galpin | H04N 19/82 |
| 2020/0294222 | A1* | 9/2020 | Wen | G06T 7/11 |
| 2021/0051322 | A1* | 2/2021 | Coelho | H04N 19/147 |
| 2022/0103816 | A1* | 3/2022 | Karczewicz | H04N 19/117 |

FOREIGN PATENT DOCUMENTS

| | | | |
|---|---|---|---|
| WO | 2016146158 | A1 | 9/2016 |
| WO | 2020061008 | A1 | 3/2020 |
| WO | 2021/165569 | A1 | 8/2021 |

* cited by examiner

DISTORTION-BASED CODING TOOL DETERMINATION

CROSS-REFERENCE TO RELATED APPLICATIONS

This application is a continuation of International Application No. PCT/CN2022/122346, filed on Sep. 28, 2022, which claims the benefit of International Application No. PCT/CN2021/121977 filed on Sep. 29, 2021. The entire contents of these applications are hereby incorporated by reference in their entireties.

FIELD

Embodiments of the present disclosure relates generally to video coding techniques, and more particularly, to machine learning based coding tool selection.

BACKGROUND

In nowadays, digital video capabilities are being applied in various aspects of peoples' lives. Multiple types of video compression technologies, such as MPEG-2, MPEG-4, ITU-TH.263, ITU-TH.264/MPEG-4 Part 10 Advanced Video Coding (AVC), ITU-TH.265 high efficiency video coding (HEVC) standard, versatile video coding (VVC) standard, have been proposed for video encoding/decoding. However, coding efficiency of conventional video coding techniques is generally very low, which is undesirable.

SUMMARY

Embodiments of the present disclosure provide a solution for video processing.

In a first aspect, a method for video processing is proposed. The method comprises: determining, during a conversion between a target video block of a video and a bitstream of the video, a target coding tool for the target video block by using a machine learning model; and performing the conversion by using the target coding tool.

The method in accordance with the first aspect of the present disclosure utilizes a machine learning model in the determination of the coding tool. Compared with the conventional solution where a machine learning filter is not taken into consideration in selecting the coding tool, the proposed method can select a more proper coding tool. In this way, the coding effectiveness and coding efficiency can be improved.

In a second aspect, an apparatus for processing video data is proposed. The apparatus for processing video data comprises a processor and a non-transitory memory with instructions thereon, wherein the instructions upon execution by the processor, cause the processor to perform a method in accordance with the first aspect of the present disclosure.

In a third aspect, a non-transitory computer-readable storage medium is proposed. The non-transitory computer-readable storage medium stores instructions that cause a processor to perform a method in accordance with the first aspect of the present disclosure.

In a fourth aspect, another non-transitory computer-readable recording medium is proposed. The non-transitory computer-readable recording medium stores a bitstream of a video which is generated by a method performed by a video processing apparatus, wherein the method comprises: determining, by using a machine learning model, a target coding tool for a target video block of the video; and generating the bitstream by using the target coding tool.

In a fifth aspect, a method for storing a bitstream of a video is proposed. The method comprises: determining, by using a machine learning model, a target coding tool for a target video block of the video; generating the bitstream by using the target coding tool; and storing the bitstream in a non-transitory computer-readable recording medium.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description with reference to the accompanying drawings, the above and other objectives, features, and advantages of example embodiments of the present disclosure will become more apparent. In the example embodiments of the present disclosure, the same reference numerals usually refer to the same components.

Throughout the drawings, the same or similar reference numerals usually refer to the same or similar elements.

DETAILED DESCRIPTION

Principle of the present disclosure will now be described with reference to some embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Example Environment

Figure 1:
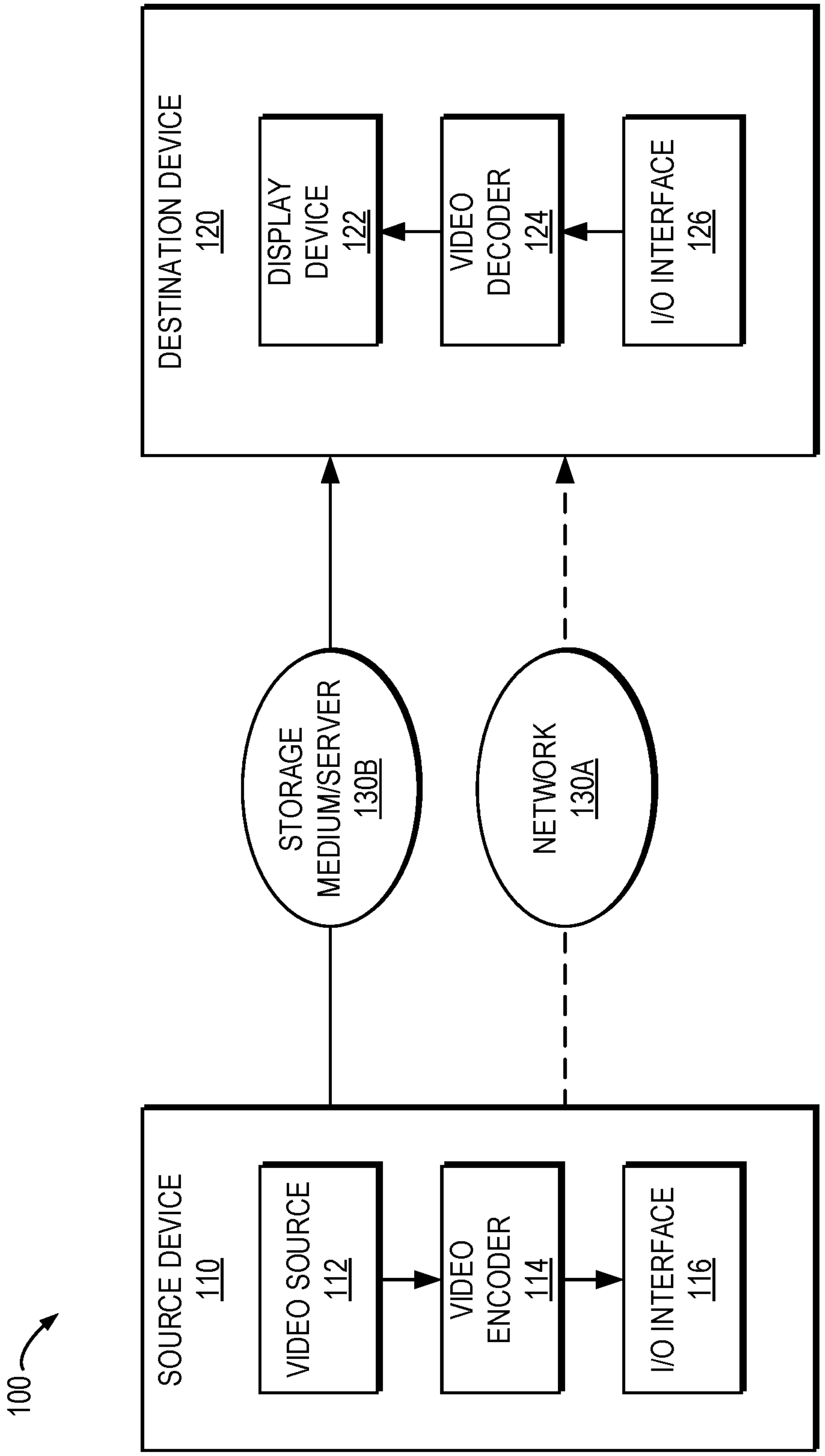
FIG. 1 illustrates a block diagram that illustrates an example video coding system, in accordance with some embodiments of the present disclosure.

FIG. 1 is a block diagram that illustrates an example video coding system 100 that may utilize the techniques of this disclosure. As shown, the video coding system 100 may include a source device 110 and a destination device 120. The source device 110 can be also referred to as a video encoding device, and the destination device 120 can be also referred to as a video decoding device. In operation, the source device 110 can be configured to generate encoded video data and the destination device 120 can be configured to decode the encoded video data generated by the source device 110. The source device 110 may include a video source 112, a video encoder 114, and an input/output (I/O) interface 116.

The video source 112 may include a source such as a video capture device. Examples of the video capture device include, but are not limited to, an interface to receive video data from a video content provider, a computer graphics system for generating video data, and/or a combination thereof.

The video data may comprise one or more pictures. The video encoder 114 encodes the video data from the video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. The I/O interface 116 may include a modulator/demodulator and/or a transmitter. The encoded video data may be transmitted directly to destination device 120 via the I/O interface 116 through the network 130A. The encoded video data may also be stored onto a storage medium/server 130B for access by destination device 120.

The destination device 120 may include an I/O interface 126, a video decoder 124, and a display device 122. The I/O interface 126 may include a receiver and/or a modem. The I/O interface 126 may acquire encoded video data from the source device 110 or the storage medium/server 130B. The video decoder 124 may decode the encoded video data. The display device 122 may display the decoded video data to a user. The display device 122 may be integrated with the destination device 120, or may be external to the destination device 120 which is configured to interface with an external display device.

The video encoder 114 and the video decoder 124 may operate according to a video compression standard, such as the High Efficiency Video Coding (HEVC) standard, Versatile Video Coding (VVC) standard and other current and/or further standards.

Figure 2:
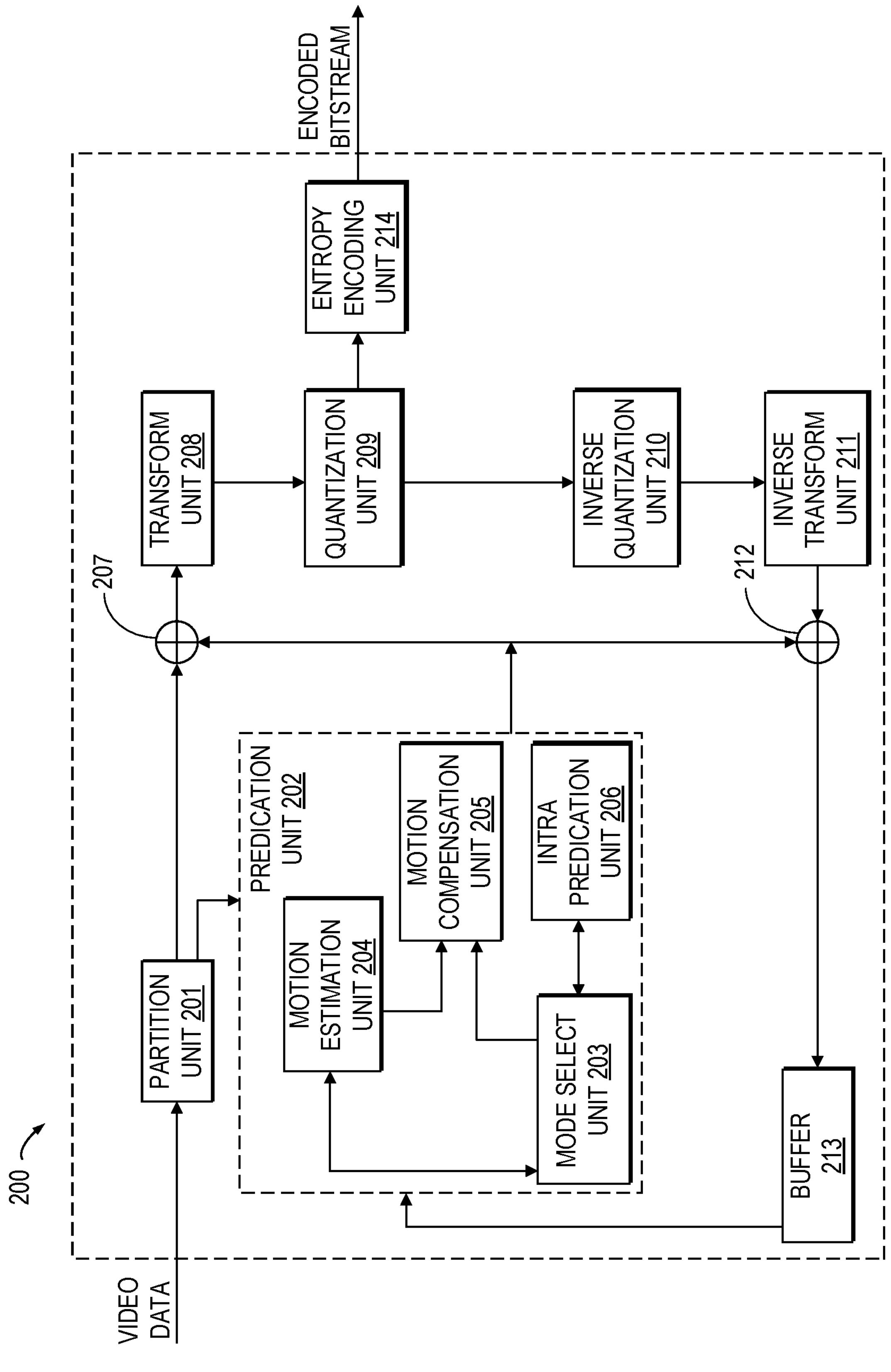
FIG. 2 illustrates a block diagram that illustrates a first example video encoder, in accordance with some embodiments of the present disclosure.

FIG. 2 is a block diagram illustrating an example of a video encoder 200, which may be an example of the video encoder 114 in the system 100 illustrated in FIG. 1, in accordance with some embodiments of the present disclosure.

The video encoder 200 may be configured to implement any or all of the techniques of this disclosure. In the example of FIG. 2, the video encoder 200 includes a plurality of functional components. The techniques described in this disclosure may be shared among the various components of the video encoder 200. In some examples, a processor may be configured to perform any or all of the techniques described in this disclosure.

In some embodiments, the video encoder 200 may include a partition unit 201, a predication unit 202 which may include a mode select unit 203, a motion estimation unit 204, a motion compensation unit 205 and an intra-prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, the video encoder 200 may include more, fewer, or different functional components. In an example, the predication unit 202 may include an intra block copy (IBC) unit. The IBC unit may perform predication in an IBC mode in which at least one reference picture is a picture where the current video block is located.

Furthermore, although some components, such as the motion estimation unit 204 and the motion compensation unit 205, may be integrated, but are represented in the example of FIG. 2 separately for purposes of explanation.

The partition unit 201 may partition a picture into one or more video blocks. The video encoder 200 and the video decoder 300 may support various video block sizes.

The mode select unit 203 may select one of the coding modes, intra or inter, e.g., based on error results, and provide the resulting intra-coded or inter-coded block to a residual generation unit 207 to generate residual block data and to a reconstruction unit 212 to reconstruct the encoded block for use as a reference picture. In some examples, the mode select unit 203 may select a combination of intra and inter predication (CIIP) mode in which the predication is based on an inter predication signal and an intra predication signal. The mode select unit 203 may also select a resolution for a motion vector (e.g., a sub-pixel or integer pixel precision) for the block in the case of inter-predication.

To perform inter prediction on a current video block, the motion estimation unit 204 may generate motion information for the current video block by comparing one or more reference frames from buffer 213 to the current video block. The motion compensation unit 205 may determine a predicted video block for the current video block based on the motion information and decoded samples of pictures from the buffer 213 other than the picture associated with the current video block.

The motion estimation unit 204 and the motion compensation unit 205 may perform different operations for a current video block, for example, depending on whether the current video block is in an I-slice, a P-slice, or a B-slice. As used herein, an "I-slice" may refer to a portion of a picture composed of macroblocks, all of which are based upon macroblocks within the same picture. Further, as used herein, in some aspects, "P-slices" and "B-slices" may refer to portions of a picture composed of macroblocks that are not dependent on macroblocks in the same picture.

In some examples, the motion estimation unit 204 may perform uni-directional prediction for the current video block, and the motion estimation unit 204 may search reference pictures of list 0 or list 1 for a reference video block for the current video block. The motion estimation unit 204 may then generate a reference index that indicates the reference picture in list 0 or list 1 that contains the reference video block and a motion vector that indicates a spatial displacement between the current video block and the reference video block. The motion estimation unit 204 may output the reference index, a prediction direction indicator, and the motion vector as the motion information of the current video block. The motion compensation unit 205 may generate the predicted video block of the current video block based on the reference video block indicated by the motion information of the current video block.

Alternatively, in other examples, the motion estimation unit 204 may perform bi-directional prediction for the current video block. The motion estimation unit 204 may search the reference pictures in list 0 for a reference video block for the current video block and may also search the reference pictures in list 1 for another reference video block for the current video block. The motion estimation unit 204 may then generate reference indexes that indicate the reference pictures in list 0 and list 1 containing the reference video blocks and motion vectors that indicate spatial displacements between the reference video blocks and the current video block. The motion estimation unit 204 may output the reference indexes and the motion vectors of the current video block as the motion information of the current video block. The motion compensation unit 205 may generate the predicted video block of the current video block based on the reference video blocks indicated by the motion information of the current video block.

In some examples, the motion estimation unit 204 may output a full set of motion information for decoding processing of a decoder. Alternatively, in some embodiments, the motion estimation unit 204 may signal the motion information of the current video block with reference to the motion information of another video block. For example, the motion estimation unit 204 may determine that the motion information of the current video block is sufficiently similar to the motion information of a neighboring video block.

In one example, the motion estimation unit 204 may indicate, in a syntax structure associated with the current video block, a value that indicates to the video decoder 300 that the current video block has the same motion information as the another video block.

In another example, the motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

The intra prediction unit 206 may perform intra prediction on the current video block. When the intra prediction unit 206 performs intra prediction on the current video block, the intra prediction unit 206 may generate prediction data for the current video block based on decoded samples of other video blocks in the same picture. The prediction data for the current video block may include a predicted video block and various syntax elements.

The residual generation unit 207 may generate residual data for the current video block by subtracting (e.g., indicated by the minus sign) the predicted video block (s) of the current video block from the current video block. The residual data of the current video block may include residual video blocks that correspond to different sample components of the samples in the current video block.

In other examples, there may be no residual data for the current video block for the current video block, for example in a skip mode, and the residual generation unit 207 may not perform the subtracting operation.

The transform processing unit 208 may generate one or more transform coefficient video blocks for the current video block by applying one or more transforms to a residual video block associated with the current video block.

After the transform processing unit 208 generates a transform coefficient video block associated with the current video block, the quantization unit 209 may quantize the transform coefficient video block associated with the current video block based on one or more quantization parameter (QP) values associated with the current video block.

The inverse quantization unit 210 and the inverse transform unit 211 may apply inverse quantization and inverse transforms to the transform coefficient video block, respectively, to reconstruct a residual video block from the transform coefficient video block. The reconstruction unit 212 may add the reconstructed residual video block to corresponding samples from one or more predicted video blocks generated by the predication unit 202 to produce a reconstructed video block associated with the current video block for storage in the buffer 213.

After the reconstruction unit 212 reconstructs the video block, loop filtering operation may be performed to reduce video blocking artifacts in the video block.

The entropy encoding unit 214 may receive data from other functional components of the video encoder 200. When the entropy encoding unit 214 receives the data, the entropy encoding unit 214 may perform one or more entropy encoding operations to generate entropy encoded data and output a bitstream that includes the entropy encoded data.

Figure 3:
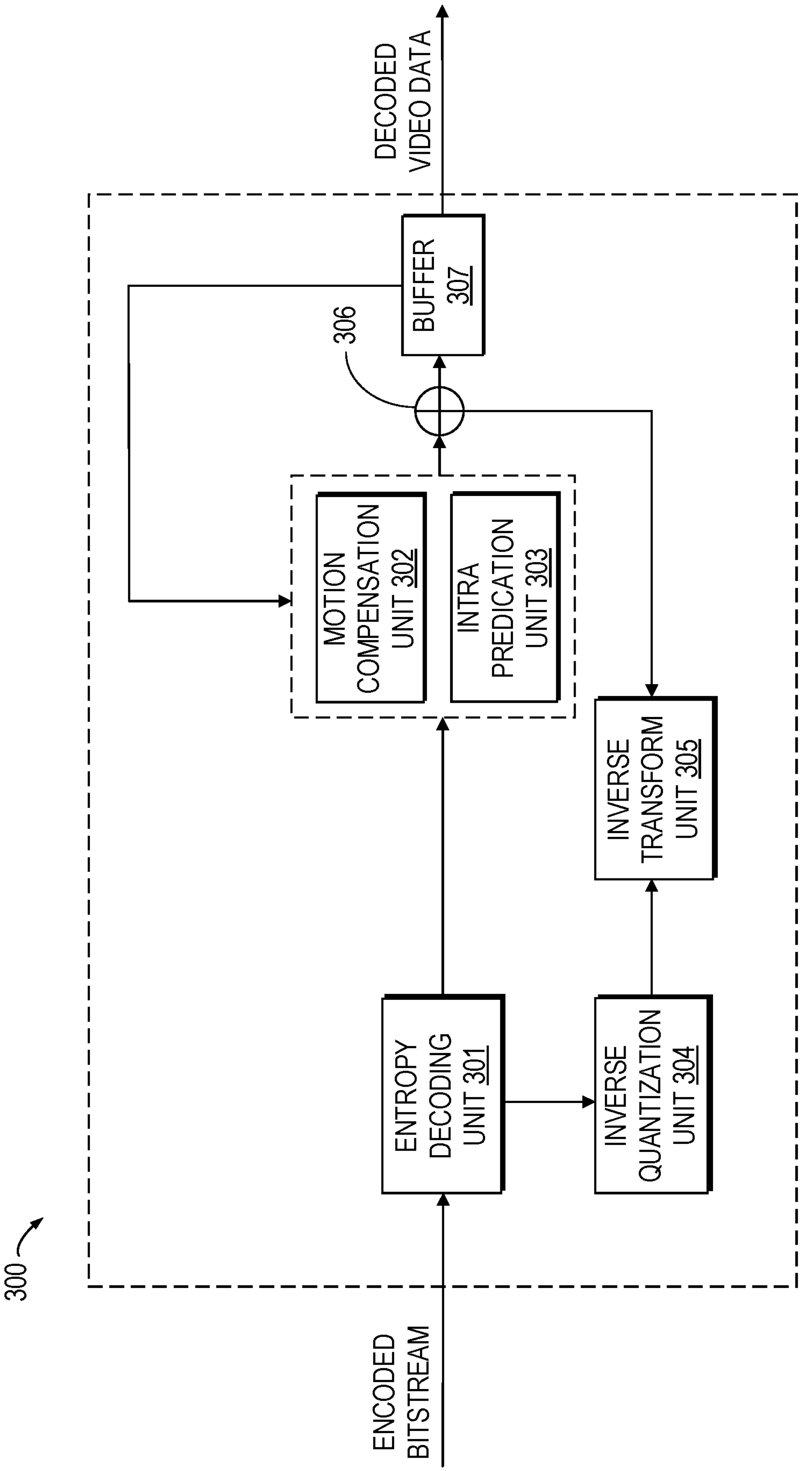
FIG. 3 illustrates a block diagram that illustrates an example video decoder, in accordance with some embodiments of the present disclosure.

FIG. 3 is a block diagram illustrating an example of a video decoder 300, which may be an example of the video decoder 124 in the system 100 illustrated in FIG. 1, in accordance with some embodiments of the present disclosure.

The video decoder 300 may be configured to perform any or all of the techniques of this disclosure. In the example of FIG. 3, the video decoder 300 includes a plurality of functional components. The techniques described in this disclosure may be shared among the various components of the video decoder 300. In some examples, a processor may be configured to perform any or all of the techniques described in this disclosure.

In the example of FIG. 3, the video decoder 300 includes an entropy decoding unit 301, a motion compensation unit 302, an intra prediction unit 303, an inverse quantization unit 304, an inverse transformation unit 305, and a reconstruction unit 306 and a buffer 307. The video decoder 300 may, in some examples, perform a decoding pass generally reciprocal to the encoding pass described with respect to video encoder 200.

The entropy decoding unit 301 may retrieve an encoded bitstream. The encoded bitstream may include entropy coded video data (e.g., encoded blocks of video data). The entropy decoding unit 301 may decode the entropy coded video data, and from the entropy decoded video data, the motion compensation unit 302 may determine motion information including motion vectors, motion vector precision, reference picture list indexes, and other motion information. The motion compensation unit 302 may, for example, determine such information by performing the AMVP and merge mode. AMVP is used, including derivation of several most probable candidates based on data from adjacent PBs and the reference picture. Motion information typically includes the horizontal and vertical motion vector displacement values, one or two reference picture indices, and, in the case of prediction regions in B slices, an identification of which reference picture list is associated with each index. As used herein, in some aspects, a "merge mode" may refer to deriving the motion information from spatially or temporally neighboring blocks.

The motion compensation unit 302 may produce motion compensated blocks, possibly performing interpolation based on interpolation filters. Identifiers for interpolation filters to be used with sub-pixel precision may be included in the syntax elements.

The motion compensation unit 302 may use the interpolation filters as used by the video encoder 200 during encoding of the video block to calculate interpolated values for sub-integer pixels of a reference block. The motion compensation unit 302 may determine the interpolation filters used by the video encoder 200 according to the received syntax information and use the interpolation filters to produce predictive blocks.

The motion compensation unit 302 may use at least part of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence. As used herein, in some aspects, a "slice" may refer to a data structure that can be decoded independently from other slices of the same picture, in terms of entropy coding, signal prediction, and residual signal reconstruction. A slice can either be an entire picture or a region of a picture.

The intra prediction unit 303 may use intra prediction modes for example received in the bitstream to form a prediction block from spatially adjacent blocks. The inverse quantization unit 304 inverse quantizes, i.e., de-quantizes, the quantized video block coefficients provided in the bitstream and decoded by entropy decoding unit 301. The inverse transform unit 305 applies an inverse transform.

The reconstruction unit 306 may obtain the decoded blocks, e.g., by summing the residual blocks with the corresponding prediction blocks generated by the motion compensation unit 302 or intra-prediction unit 303. If desired, a deblocking filter may also be applied to filter the decoded blocks in order to remove blockiness artifacts. The decoded video blocks are then stored in the buffer 307, which provides reference blocks for subsequent motion compensation/intra predication and also produces decoded video for presentation on a display device.

Some exemplary embodiments of the present disclosure will be described in detailed hereinafter. It should be understood that section headings are used in the present document to facilitate ease of understanding and do not limit the embodiments disclosed in a section to only that section. Furthermore, while certain embodiments are described with reference to Versatile Video Coding or other specific video codecs, the disclosed techniques are applicable to other video coding technologies also. Furthermore, while some embodiments describe video coding steps in detail, it will be understood that corresponding steps decoding that undo the coding will be implemented by a decoder. Furthermore, the term video processing encompasses video coding or compression, video decoding or decompression and video transcoding in which video pixels are represented from one compressed format into another compressed format or at a different compressed bitrate.

1. Summary

This disclosure is related to video coding technologies. Specifically, it is related to the loop filter in image/video coding. It may be applied to the existing video coding standard like High-Efficiency Video Coding (HEVC), Versatile Video Coding (VVC), or the standard (e.g., AVS3) to be finalized. It may be also applicable to future video coding standards or video codec or being used as post-processing method which is out of encoding/decoding process.

2. Background

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC. VVC version 1 was finalized in July 2020.

The latest version of VVC draft, i.e., Versatile Video Coding (Draft 10) could be found at:

http://phenix.it-sudparis.eu/jvet/doc_end_user/current_document.php?id=10399.

The latest reference software of VVC, named VTM, could be found at:

https://vcgit.hhi.fraunhofer.de/jvet/VVCSoftware_VTM/-/tags/VTM-10.0.

2.1. Color Space and Chroma Subsampling

Color space, also known as the color model (or color system), is an abstract mathematical model which simply describes the range of colors as tuples of numbers, typically as 3 or 4 values or color components (e.g. RGB). Basically speaking, color space is an elaboration of the coordinate system and sub-space.

For video compression, the most frequently used color spaces are YCbCr and RGB. YCbCr, Y'CbCr, or Y Pb/Cb Pr/Cr, also written as YCBCR or Y'CBCR, is a family of color spaces used as a part of the color image pipeline in video and digital photography systems. Y' is the luma component and CB and CR are the blue-difference and red-difference chroma components. Y' (with prime) is distinguished from Y, which is luminance, meaning that light intensity is nonlinearly encoded based on gamma corrected RGB primaries.

Chroma subsampling is the practice of encoding images by implementing less resolution for chroma information than for luma information, taking advantage of the human visual system's lower acuity for color differences than for luminance.

2.1.1. 4:4:4

Each of the three Y'CbCr components have the same sample rate, thus there is no chroma subsampling. This scheme is sometimes used in high-end film scanners and cinematic post production.

2.1.2. 4:2:2

The two chroma components are sampled at half the sample rate of luma: the horizontal chroma resolution is halved. This reduces the bandwidth of an uncompressed video signal by one-third with little to no visual difference.

2.1.3. 4:2:0

In 4:2:0, the horizontal sampling is doubled compared to 4:1:1, but as the Cb and Cr channels are only sampled on each alternate line in this scheme, the vertical resolution is halved. The data rate is thus the same. Cb and Cr are each subsampled at a factor of 2 both horizontally and vertically. There are three variants of 4:2:0 schemes, having different horizontal and vertical siting.

- In MPEG-2, Cb and Cr are cosited horizontally. Cb and Cr are sited between pixels in the vertical direction (sited interstitially).
- In JPEG/JFIF, H.261, and MPEG-1, Cb and Cr are sited interstitially, halfway between alternate luma samples.
- In 4:2:0 DV, Cb and Cr are co-sited in the horizontal direction. In the vertical direction, they are co-sited on alternating lines.

2.2. Definitions of Video Units

A picture is divided into one or more tile rows and one or more tile columns. A tile is a sequence of CTUs that covers a rectangular region of a picture.

A tile is divided into one or more bricks, each of which consisting of a number of CTU rows within the tile.

A tile that is not partitioned into multiple bricks is also referred to as a brick. However, a brick that is a true subset of a tile is not referred to as a tile.

A slice either contains a number of tiles of a picture or a number of bricks of a tile.

Two modes of slices are supported, namely the raster-scan slice mode and the rectangular slice mode. In the raster-scan slice mode, a slice contains a sequence of tiles in a tile raster scan of a picture. In the rectangular slice mode, a slice contains a number of bricks of a picture that collectively form a rectangular region of the picture. The bricks within a rectangular slice are in the order of brick raster scan of the slice.

Figure 4:
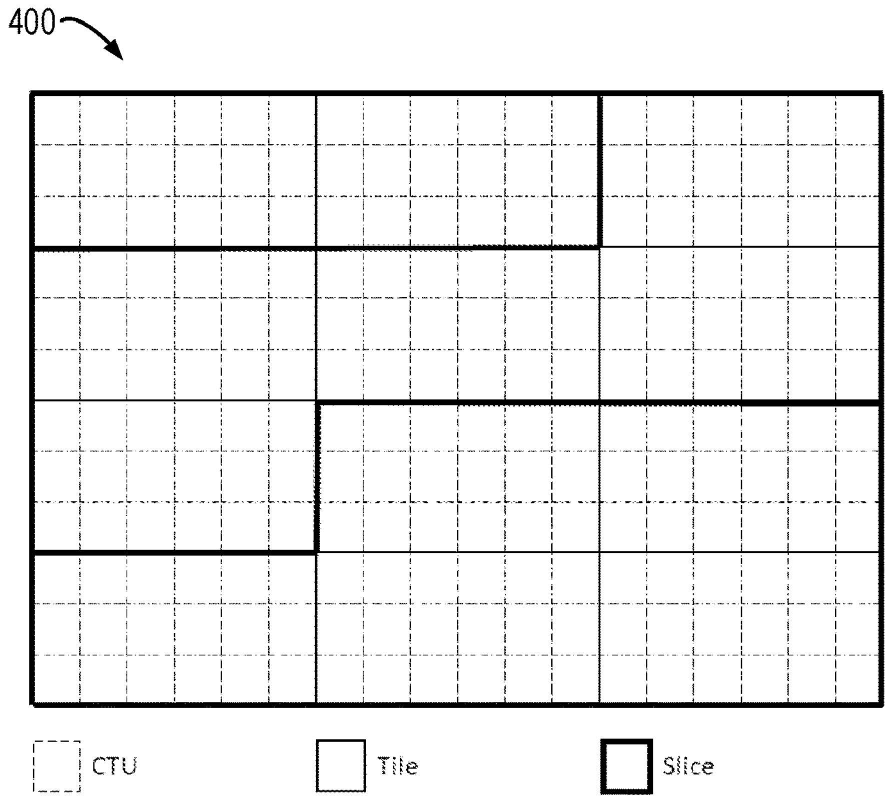
FIG. 4 illustrates an example diagram showing an example of raster-scan slice partitioning of a picture.

FIG. 4 illustrates an example diagram 400 showing an example of raster-scan slice partitioning of a picture. In FIG. 4, the picture is divided into 12 tiles and 3 raster-scan slices. The picture in FIG. 4 with 18 by 12 luma CTUs is partitioned into 12 tiles and 3 raster-scan slices (informative).

Figure 5:
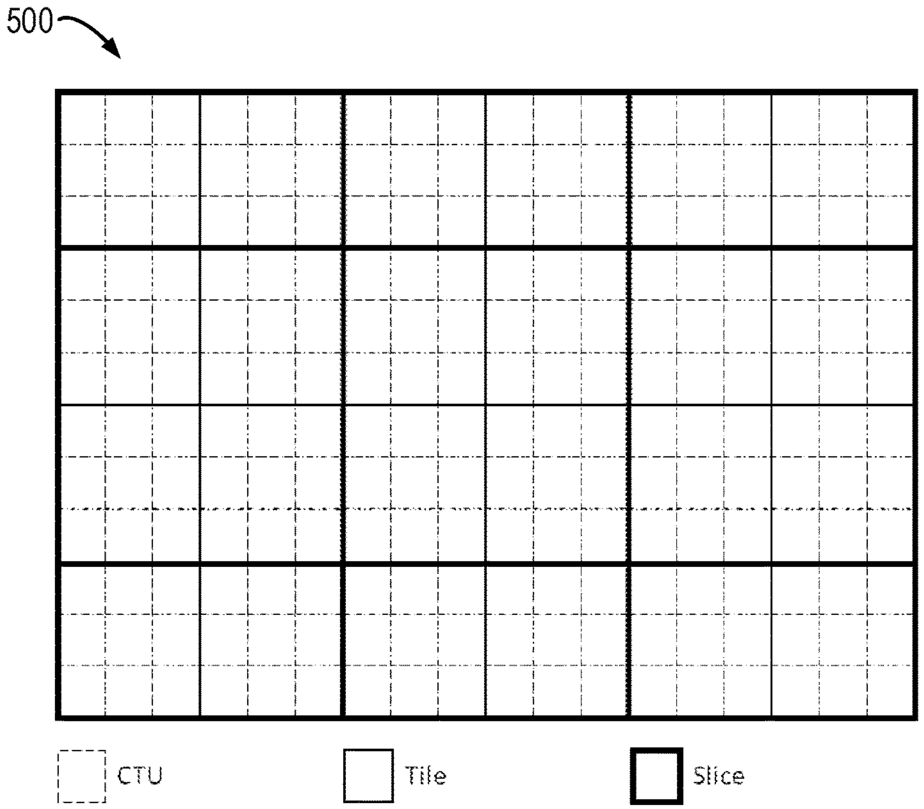
FIG. 5 illustrates an example diagram showing an example of rectangular slice partitioning of a picture.

FIG. 5 illustrates an example diagram 500 showing an example of rectangular slice partitioning of a picture. In FIG. 5, the picture is divided into 24 tiles (6 tile columns and 4 tile rows) and 9 rectangular slices. The picture in FIG. 5 with 18 by 12 luma CTUs is partitioned into 24 tiles and 9 rectangular slices (informative).

Figure 6:
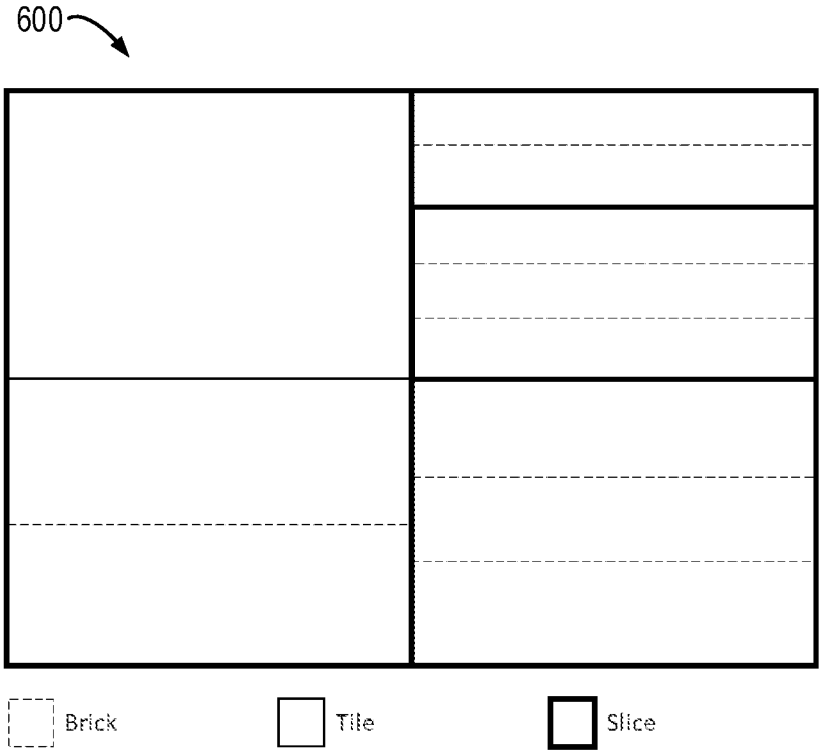
FIG. 6 illustrates an example diagram showing an example of a picture partitioned into tiles, bricks, and rectangular slices.

FIG. 6 illustrates an example diagram 600 showing an example of a picture partitioned into tiles, bricks, and rectangular slices. In FIG. 6, the picture is divided into 4 tiles (2 tile columns and 2 tile rows), 11 bricks (the top-left tile contains 1 brick, the top-right tile contains 5 bricks, the bottom-left tile contains 2 bricks, and the bottom-right tile contain 3 bricks), and 4 rectangular slices. The picture in FIG. 6 is partitioned into 4 tiles, 11 bricks, and 4 rectangular slices (informative).

2.2.1. CTU/CTB Sizes

In VVC, the CTU size, signaled in SPS by the syntax element log 2_ctu_size_minus2, could be as small as 4×4.

7.3.2.3 Sequence Parameter Set RBSP Syntax

| | Descriptor |
|---|---|
| seq_parameter_set_rbsp( ) { | |
| sps_decoding_parameter_set_id | u(4) |
| sps_video_parameter_set_id | u(4) |
| sps_max_sub_layers_minus1 | u(3) |
| sps_reserved_zero_5bits | u(5) |
| profile_tier_level( sps_max_sub_layers_minus1 ) | |

-continued

| | Descriptor |
|---|---|
| gra_enabled_flag | u(1) |
| sps_seq_parameter_set_id | ue(v) |
| chroma_format_idc | ue(v) |
| if( chroma_format_idc = = 3 ) | |
| separate_colour_plane_flag | u(1) |
| pic_width_in_luma_samples | ue(v) |
| pic_height_in_luma_samples | ue(v) |
| conformance_window_flag | u(1) |
| if( conformance_window_flag ) { | |
| conf_win_left_offset | ue(v) |
| conf_win_right_offset | ue(v) |
| conf_win_top_offset | ue(v) |
| conf_win_bottom_offset | ue(v) |
| } | |
| bit_depth_luma_minus8 | ue(v) |
| bit_depth_chroma_minus8 | ue(v) |
| log2_max_pic_order_cnt_lsb_minus4 | ue(v) |
| sps_sub_layer_ordering_info_present_flag | u(1) |
| for( i = ( sps_sub_layer_ordering_info_present_flag ? 0 : sps_max_sub_layers_minus1 ); i <= sps_max_sub_layers_minus1; i++ ) { | |
| sps_max_dec_pic_buffering_minus1[ i ] | ue(v) |
| sps_max_num_reorder_pics[ i ] | ue(v) |
| sps_max_latency_increase_plus1[ i ] | ue(v) |
| } | |
| long_term_ref_pics_flag | u(1) |
| sps_idr_rpl_present_flag | u(1) |
| rpl1_same_as_rpl0_flag | u(1) |
| for( i = 0; i < !rpl1_same_as_rpl0_flag ? 2 : 1; i++ ) { | |
| num_ref_pic_lists_in_sps[ i ] | ue(v) |
| for( j = 0; j < num_ref_pic_lists_in_sps[ i ]; j++) | |
| ref_pic_list_struct( i, j ) | |
| } | |
| qtbtt_dual_tree_intra_flag | u(1) |
| log2_ctu_size_minus2 | ue(v) |
| log2_min_luma_coding_block_size_minus2 | ue(v) |
| partition_constraints_override_enabled_flag | u(1) |
| sps_log2_diff_min_qt_min_cb_intra_slice_luma | ue(v) |
| sps_log2_diff_min_qt_min_cb_inter_slice | ue(v) |
| sps_max_mtt_hierarchy_depth_inter_slice | ue(v) |
| sps_max_mtt_hierarchy_depth_intra_slice_luma | ue(v) |
| if( sps_max_mtt_hierarchy_depth_intra_slice_luma != 0 ) { | |
| sps_log2_diff_max_bt_min_qt_intra_slice_luma | ue(v) |
| sps_log2_diff_max_tt_min_qt_intra_slice_luma | ue(v) |
| } | |
| if( sps_max_mtt_hierarchy_depth_inter_slices != 0 ) { | |
| sps_log2_diff_max_bt_min_qt_inter_slice | ue(v) |
| sps_log2_diff_max_tt_min_qt_inter_slice | ue(v) |
| } | |
| if( qtbtt_dual_tree_intra_flag ) { | |
| sps_log2_diff_min_qt_min_cb_intra_slice_chroma | ue(v) |
| sps_max_mtt_hierarchy_depth_intra_slice_chroma | ue(v) |
| if ( sps_max_mtt_hierarchy_depth_intra_slice_chroma != 0 ) { | |
| sps_log2_diff_max_bt_min_qt_intra_slice_chroma | ue(v) |
| sps_log2_diff_max_tt_min_qt_intra_slice_chroma | ue(v) |
| } | |
| } | |
| ... | |
| rbsp_trailing_bits( ) | |
| } | |

log 2_ctu_size_minus2 plus 2 specifies the luma coding tree block size of each CTU.

log 2_min_luma_coding_block_size_minus2 plus 2 specifies the minimum luma coding block size.

The variables CtbLog2SizeY, CtbSizeY, MinCbLog2 SizeY, MinCbSizeY, MinTbLog2Size Y, MaxTbLog2SizeY, MinTbSizeY, MaxTbSizeY, PicWidthInCtbsY, PicHeightInCtbsY, PicSizeInCtbsY, Pic WidthInMinCbsY, PicHeightInMinCbsY, PicSizeInMinCbsY, PicSizeInSamplesY, PicWidthInSamplesC and PicHeightInSamplesC are derived as follows:

$$CtbLog2SizeY = \text{log2\_ctu\_size\_minus2} + 2 \quad (7\text{-}9)$$

$$CtbSizeY = 1 \ll CtbLog2SizeY \quad (7\text{-}10)$$

$$MinCbLog2SizeY = \text{log2\_min\_luma\_coding\_block\_size\_minus2} + 2 \quad (7\text{-}11)$$

$$MinCbSizeY = 1 \ll MinCbLog2SizeY \quad (7\text{-}12)$$

$$MinTbLog2SizeY = 2 \quad (7\text{-}13)$$

$$MaxTbLog2SizeY = 6 \quad (7\text{-}14)$$

-continued $$MinTbSizeY = 1 \ll MinTbLog2SizeY \quad (7\text{-}15)$$

$$MaxTbSizeY = 1 \ll MaxTbLog2SizeY \quad (7\text{-}16)$$

$$PicWidthInCtbsY = \text{Ceil}(\text{pic\_width\_in\_luma\_samples} \div CtbSizeY) \quad (7\text{-}17)$$

$$PicHeightInCtbsY = \text{Ceil}(\text{pic\_height\_in\_luma\_samples} \div CtbSizeY) \quad (7\text{-}18)$$

$$PicSizeInCtbsY = PicWidthInCtbsY * PicHeightInCtbsY \quad (7\text{-}19)$$

$$PicWidthInMinCbsY = \text{pic\_width\_in\_luma\_samples}/MinCbSizeY \quad (7\text{-}20)$$

$$PicHeightInMinCbsY = \text{pic\_height\_in\_luma\_samples}/MinCbSizeY \quad (7\text{-}21)$$

$$PicSizeInMinCbsY = PicWidthInMinCbsY * PicHeightInMinCbsY \quad (7\text{-}22)$$

$$PicSizeInSamplesY = \text{pic\_width\_in\_luma\_samples} * \text{pic\_height\_in\_luma\_samples} \quad (7\text{-}23)$$

$$PicWidthInSamplesC = \text{pic\_width\_in\_luma\_samples}/SubWidthC \quad (7\text{-}24)$$

$$PicHeightInSamplesC = \text{pic\_height\_in\_luma\_samples}/SubHeightC \quad (7\text{-}25)$$

2.2.2. CTUs in a Picture

Figure 7A:
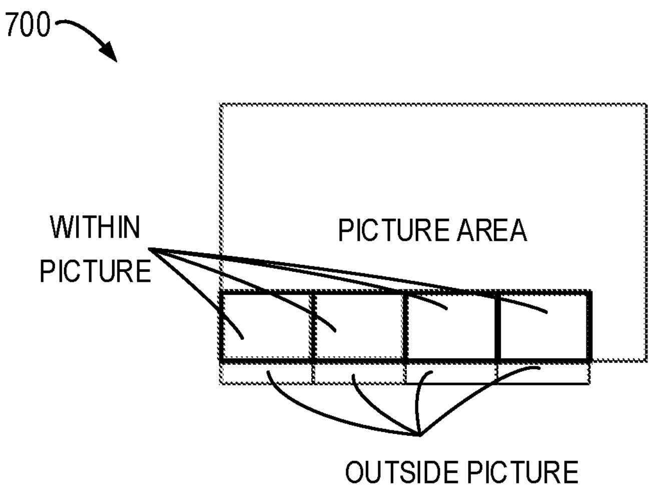
FIG. 7A illustrates an example diagram showing CTBs crossing the bottom picture border.
Figure 7B:
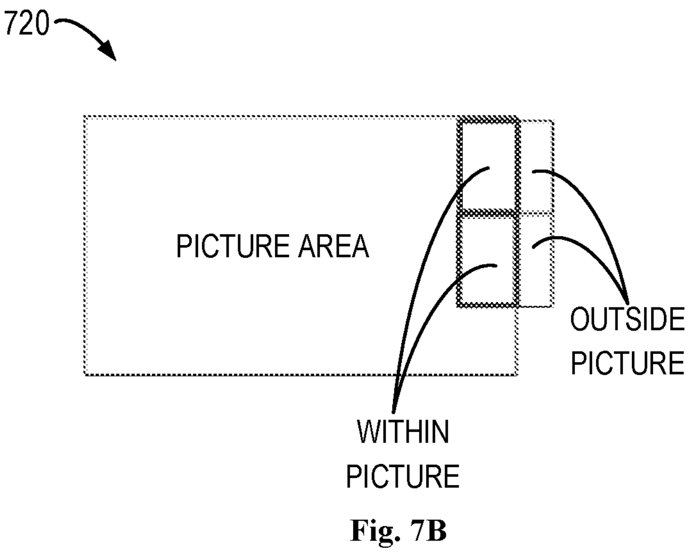
FIG. 7B illustrates an example diagram showing CTBs crossing the right picture border.
Figure 7C:
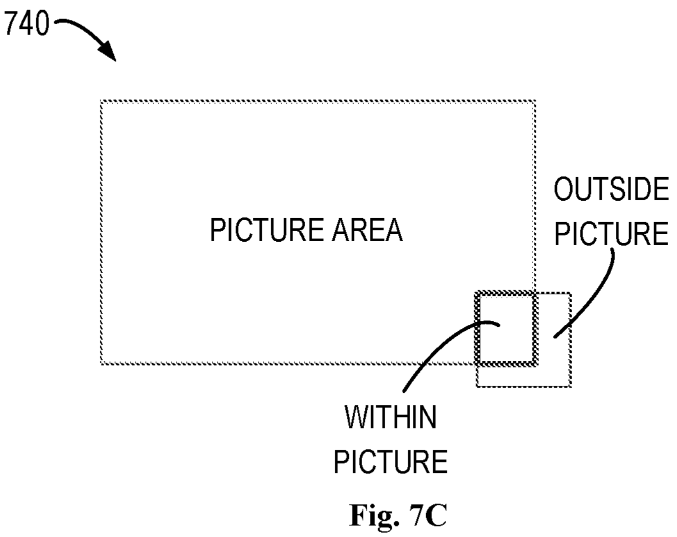
FIG. 7C illustrates an example diagram showing CTBs crossing the right bottom picture border.

Suppose the CTB/LCU size indicated by M×N (typically M is equal to N, as defined in HEVC/VVC), and for a CTB located at picture (or tile or slice or other kinds of types, picture border is taken as an example) border, K×L samples are within picture border wherein either K<M or L<N. FIG. 7A illustrate an example diagram 700 showing CTBs crossing the bottom picture border, in which K=M, L<N. FIG. 7B illustrates an example diagram 720 showing CTBs crossing the right picture border, in which K<M, L=N. FIG. 7C illustrates an example diagram 740 showing CTBs crossing the right bottom picture border, in which K<M, L<N. For those CTBs as depicted in FIGS. 7A-7C, the CTB size is still equal to M×N, however, the bottom boundary/right boundary of the CTB is outside the picture.

2.3. Coding Flow of a Typical Video Codec

Figure 8:
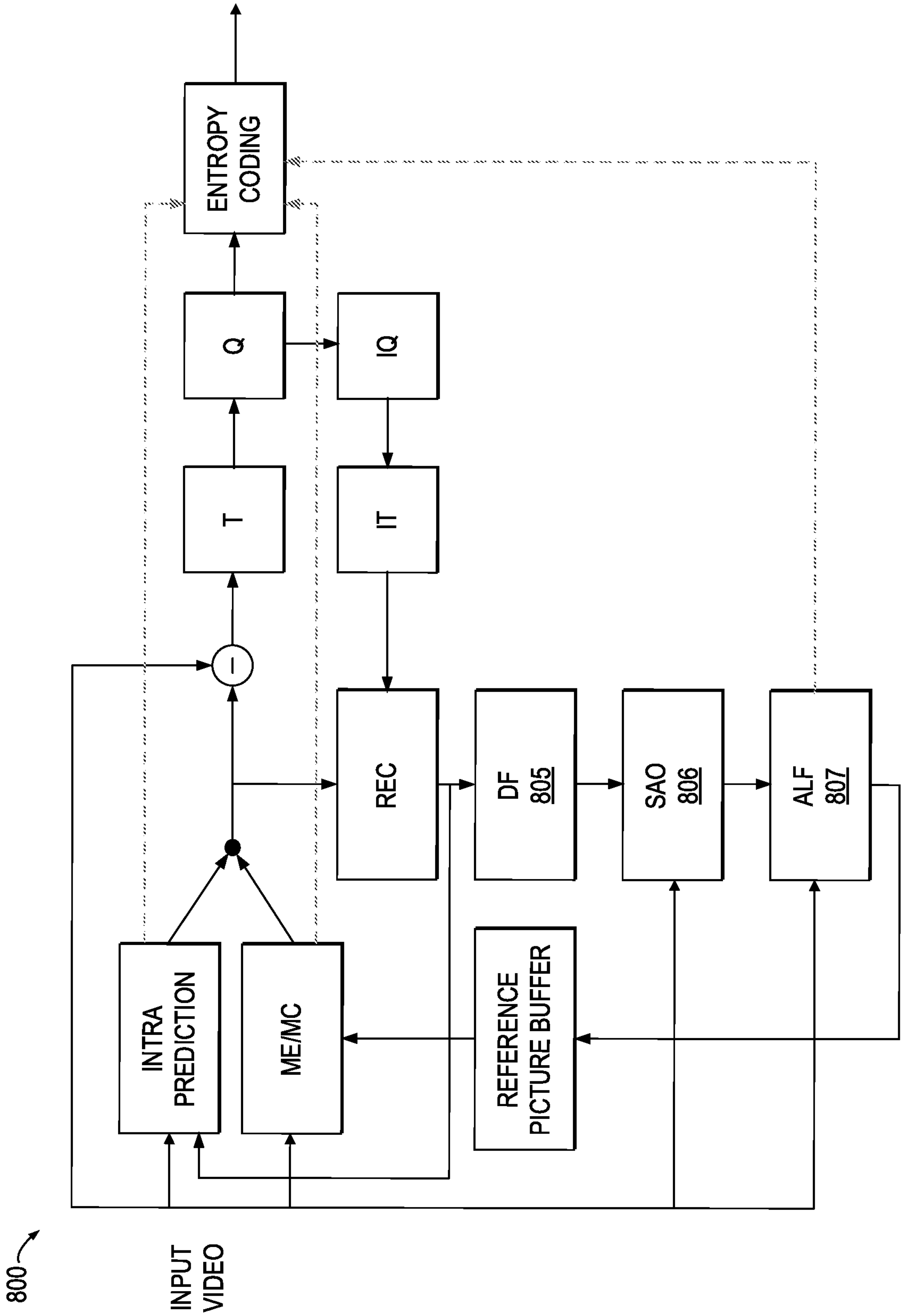
FIG. 8 illustrates an example diagram showing an example of encoder block diagram.

FIG. 8 illustrates an example diagram 800 showings an example of encoder block diagram of VVC, which contains three in-loop filtering blocks: deblocking filter (DF) 805, sample adaptive offset (SAO) 806 and ALF 807. Unlike DF 805, which uses predefined filters, SAO 806 and ALF 807 utilize the original samples of the current picture to reduce the mean square errors between the original samples and the reconstructed samples by adding an offset and by applying a finite impulse response (FIR) filter, respectively, with coded side information signaling the offsets and filter coefficients. ALF 807 is located at the last processing stage of each picture and can be regarded as a tool trying to catch and fix artifacts created by the previous stages.

2.4. Deblocking Filter (DB)

The input of DB is the reconstructed samples before in-loop filters.

The vertical edges in a picture are filtered first. Then the horizontal edges in a picture are filtered with samples modified by the vertical edge filtering process as input. The vertical and horizontal edges in the CTBs of each CTU are processed separately on a coding unit basis. The vertical edges of the coding blocks in a coding unit are filtered starting with the edge on the left-hand side of the coding blocks proceeding through the edges towards the right-hand side of the coding blocks in their geometrical order. The horizontal edges of the coding blocks in a coding unit are filtered starting with the edge on the top of the coding blocks proceeding through the edges towards the bottom of the coding blocks in their geometrical order.

Figure 9:
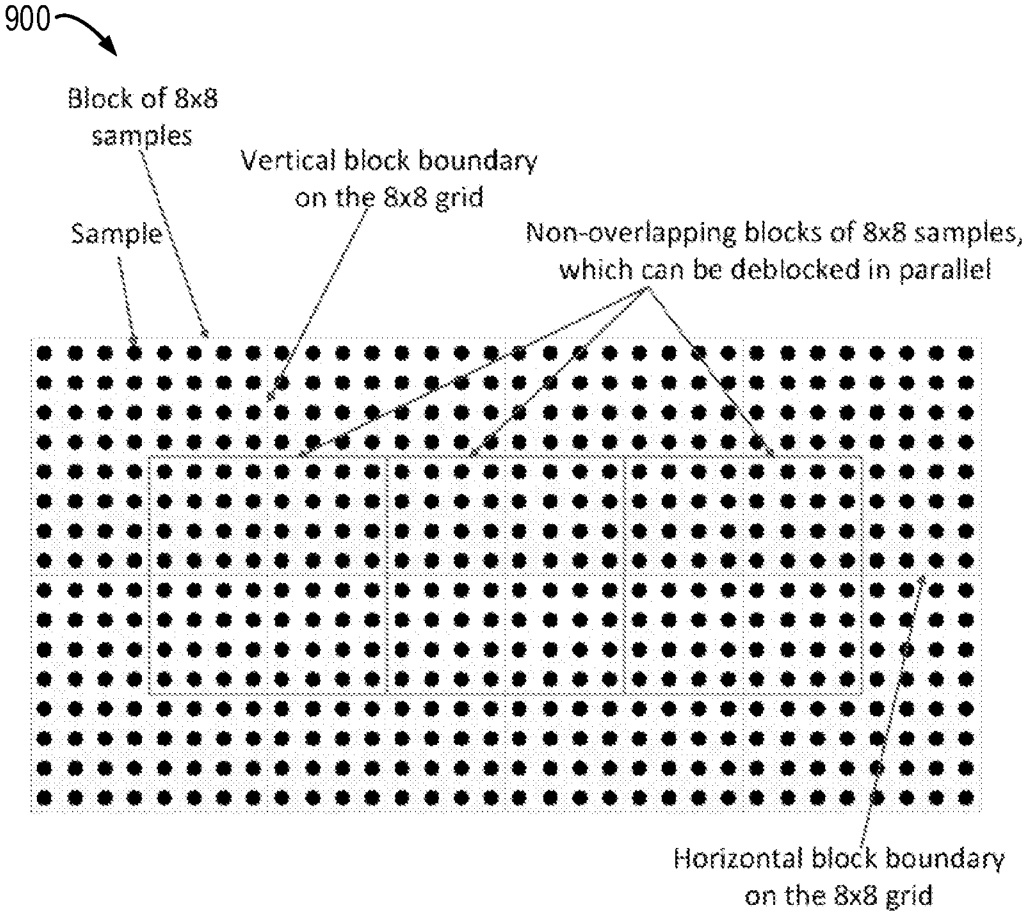
FIG. 9 illustrates an example diagram showing an illustration of picture samples and horizontal and vertical block boundaries on the 8×8 grid, and the nonoverlapping blocks of the 8×8 samples.

FIG. 9 illustrates an example diagram 900 showing an illustration of picture samples and horizontal and vertical block boundaries on the 8×8 grid, and the nonoverlapping blocks of the 8×8 samples, which can be deblocked in parallel.

2.4.1. Boundary Decision

Filtering is applied to 8×8 block boundaries. In addition, it must be a transform block boundary or a coding subblock boundary (e.g., due to usage of Affine motion prediction, ATMVP). For those which are not such boundaries, filter is disabled.

2.4.2. Boundary Strength Calculation

For a transform block boundary/coding subblock boundary, if it is located in the 8×8 grid, it may be filterd and the setting of $bS[xD_i][yD_j]$ (wherein $[xD_i][yD_j]$ denotes the coordinate) for this edge is defined in Table 1 and Table 2, respectively.

TABLE 1

Boundary strength (when SPS IBC is disabled)

| Priority | Conditions | Y | U | V |
|---|---|---|---|---|
| 5 | At least one of the adjacent blocks is intra | 2 | 2 | 2 |
| 4 | TU boundary and at least one of the adjacent blocks has non-zero transform coefficients | 1 | 1 | 1 |
| 3 | Reference pictures or number of MVs (1 for uni-prediction, 2 for bi-prediction) of the adjacent blocks are different | 1 | N/A | N/A |
| 2 | Absolute difference between the motion vectors of same reference picture that belong to the adjacent blocks is greater than or equal to one integer luma sample | 1 | N/A | N/A |
| 1 | Otherwise | 0 | 0 | 0 |

TABLE 2

Boundary strength (when SPS IBC is enabled)

| Priority | Conditions | Y | U | V |
|---|---|---|---|---|
| 8 | At least one of the adjacent blocks is intra | 2 | 2 | 2 |
| 7 | TU boundary and at least one of the adjacent blocks has non-zero transform coefficients | 1 | 1 | 1 |

TABLE 2-continued

| Boundary strength (when SPS IBC is enabled) | | | | |
|---|---|---|---|---|
| Priority | Conditions | Y | U | V |
| 6 | Prediction mode of adjacent blocks is different (e.g., one is IBC, one is inter) | 1 | | |
| 5 | Both IBC and absolute difference between the motion vectors that belong to the adjacent blocks is greater than or equal to one integer luma sample | 1 | N/A | N/A |
| 4 | Reference pictures or number of MVs (1 for uni-prediction, 2 for bi-prediction) of the adjacent blocks are different | 1 | N/A | N/A |
| 3 | Absolute difference between the motion vectors of same reference picture that belong to the adjacent blocks is greater than or equal to one integer luma sample | 1 | N/A | N/A |
| 1 | Otherwise | 0 | 0 | 0 |

2.4.3. Deblocking Decision for Luma Component

Figure 10:
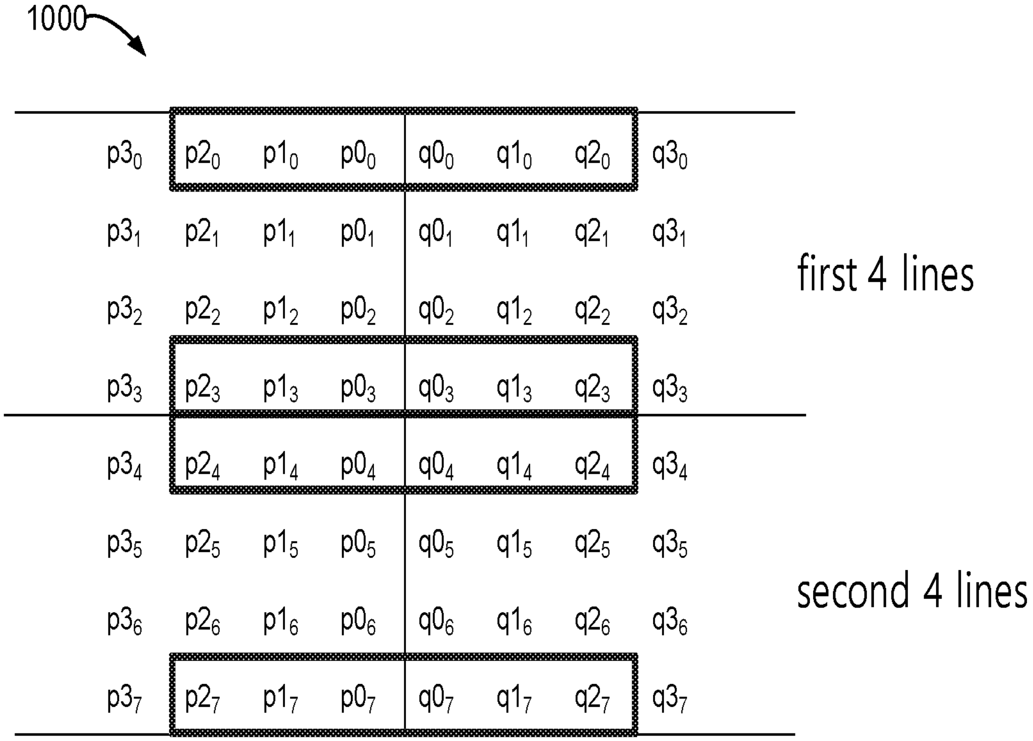
FIG. 10 illustrates an example diagram showing pixels involved in filter on/off decision and strong/weak filter selection.

The deblocking decision process is described in this sub-section. FIG. 10 illustrates an example diagram 1000 showing pixels involved in filter on/off decision and strong/weak filter selection.

Wider-stronger luma filter is filters are used only if all the Condition1, Condition2 and Condition 3 are TRUE.

The condition 1 is the "large block condition". This condition detects whether the samples at P-side and Q-side belong to large blocks, which are represented by the variable bSidePisLargeBlk and bSideQisLargeBlk respectively. The bSidePisLargeBlk and bSideQisLargeBlk are defined as follows.

bSidePisLargeBlk=((edge type is vertical and $p_0$ belongs to CU with width >=32) | | (edge type is horizontal and $p_0$ belongs to CU with height >=32))? TRUE: FALSE bSideQisLargeBlk=((edge type is vertical and $q_0$ belongs to CU with width >=32) | | (edge type is horizontal and $q_0$ belongs to CU with height >=32))? TRUE: FALSE Based on bSidePisLargeBlk and bSideQisLargeBlk, the condition 1 is defined as follows.

$$Condition1 = (bSidePisLargeBlk || bSidePisLargeBlk)\text{? TRUE:FALSE}$$

Next, if Condition 1 is true, the condition 2 will be further checked. First, the following variables are derived:

dp0, dp3, dq0, dq3 are first derived as in HEVC if (p side is greater than or equal to 32)

$$dp0 = (dp0 + \text{Abs}(p5_0 - 2 * p4_0 + p3_0) + 1) \gg 1$$

$$dp3 = (dp3 + \text{Abs}(p5_3 - 2 * p4_3 + p3_3) + 1) \gg 1$$

if (q side is greater than or equal to 32)

$$dq0 = (dq0 + \text{Abs}(q5_0 - 2 * q4_0 + q3_0) + 1) \gg 1$$

$$dq3 = (dq3 + \text{Abs}(q5_3 - 2 * q4_3 + q3_3) + 1) \gg 1$$

$$Condition2 = (d < \beta)\text{? TRUE:FALSE}$$

$$\text{where } d = dp0 + dq0 + dp3 + dq3.$$

If Condition1 and Condition2 are valid, whether any of the blocks uses sub-blocks is further checked:

```
If (bSidePisLargeBlk)
  {
    If (mode block P == SUBBLOCKMODE)
      Sp =5
    else
      Sp =7
}
else
  Sp = 3
If (bSideQisLargeBlk)
  {
    If (mode block Q == SUBBLOCKMODE)
      Sq =5
    else
      Sq =7
  }
else
  Sq = 3
```

Finally, if both the Condition 1 and Condition 2 are valid, the proposed deblocking method will check the condition 3 (the large block strong filter condition), which is defined as follows.

In the Condition3 StrongFilterCondition, the following variables are derived:

```
dpq is derived as in HEVC.
sp3 = Abs( p3 − p0 ), derived as in HEVC
if (p side is greater than or equal to 32)
    if(Sp==5)
      sp3 = ( sp3 + Abs( p5 − p3 ) + 1) >> 1
    else
      sp3 = ( sp3 + Abs( p7 − p3 ) + 1) >> 1
sq3 = Abs( q0 − q3 ), derived as in HEVC
if (q side is greater than or equal to 32)
  If(Sq==5)
    sq3 = ( sq3 + Abs( q5 − q3 ) + 1) >> 1
  else
    sq3 = ( sq3 + Abs( q7 − q3 ) + 1) >> 1
```

As in HEVC, StrongFilterCondition=(dpq is less than (β>>2), $sp_3+sq_3$ is less than (3*β>>5), and Abs($p_0-q_0$) is less than (5*$t_c$+1)>>1)? TRUE: FALSE.

2.4.4. Stronger Deblocking Filter for Luma (Designed for Larger Blocks)

Bilinear filter is used when samples at either one side of a boundary belong to a large block. A sample belonging to a large block is defined as when the width >=32 for a vertical edge, and when height >=32 for a horizontal edge.

The bilinear filter is listed below.

Block boundary samples $p_i$ for i=0 to Sp−1 and $q_i$ for j=0 to Sq−1 ($p_i$ and $q_i$ are the i-th sample within a row for filtering vertical edge, or the i-th sample within a column for filtering horizontal edge) in HEVC deblocking described above) are then replaced by linear interpolation as follows:

$$p_i' = (f_i * \text{Middle}_{s,t} + (64 - f_i) * P_s + 32) \gg 6), \text{ clipped to } p_i \pm tcPD_i$$

$$q_j' = (g_j * \text{Middle}_{s,t} + (64 - g_j) * Q_s + 32) \gg 6), \text{ clipped to } q_j \pm tcPD_j$$

where $tcPD_i$ and $tcPD_j$ term is a position dependent clipping described in Section 2.4.7 and $g_j$, $f_i$, $\text{Middle}_{s,t}$, $P_s$ and $Q_s$ are given below:

2.4.5. Deblocking Control for Chroma

The chroma strong filters are used on both sides of the block boundary. Here, the chroma filter is selected when both sides of the chroma edge are greater than or equal to 8 (chroma position), and the following decision with three conditions are satisfied: the first one is for decision of boundary strength as well as large block. The proposed filter can be applied when the block width or height which orthogonally crosses the block edge is equal to or larger than 8 in chroma sample domain. The second and third one is basically the same as for HEVC luma deblocking decision, which are on/off decision and strong filter decision, respectively.

In the first decision, boundary strength (bS) is modified for chroma filtering and the conditions are checked sequentially. If a condition is satisfied, then the remaining conditions with lower priorities are skipped.

Chroma deblocking is performed when bS is equal to 2, or bS is equal to 1 when a large block boundary is detected.

The second and third condition is basically the same as HEVC luma strong filter decision as follows.

In the second condition:

d is then derived as in HEVC luma deblocking.

The second condition will be TRUE when d is less than β.

In the third condition StrongFilterCondition is derived as follows:

dpq is derived as in HEVC.

$sp_3$=Abs($p_3$−$p_0$), derived as in HEVC.

$sq_3$=Abs($q_0$-$q_3$), derived as in HEVC.

As in HEVC design, StrongFilterCondition=(dpq is less than (β>>2), $sp_3$+$sq_3$ is less than (β>>3), and Abs($p_0$−$q_0$) is less than (5*$t_c$+1)>>1).

2.4.6. Strong Deblocking Filter for Chroma

The following strong deblocking filter for chroma is defined:

$$p_2' = (3 * p_3 + 2 * p_2 + p_1 + p_0 + q_0 + 4) \gg 3$$

$$p_1' = (2 * p_3 + p_2 + 2 * p_1 + p_0 + q_0 + q_1 + 4) \gg 3$$

$$p_0' = (p_3 + p_2 + p_1 + 2 * p_0 + q_0 + q_1 + q_2 + 4) \gg 3$$

The proposed chroma filter performs deblocking on a 4×4 chroma sample grid.

2.4.7. Position Dependent Clipping

The position dependent clipping tcPD is applied to the output samples of the luma filtering process involving strong and long filters that are modifying 7, 5 and 3 samples at the boundary. Assuming quantization error distribution, it is proposed to increase clipping value for samples which are expected to have higher quantization noise, thus expected to have higher deviation of the reconstructed sample value from the true sample value.

For each P or Q boundary filtered with asymmetrical filter, depending on the result of decision-making process in section 2.4.2, position dependent threshold table is selected from two tables (i.e., Tc7 and Tc3 tabulated below) that are provided to decoder as a side information:

$$Tc7 = \{6, 5, 4, 3, 2, 1, 1\};\ Tc3 = \{6, 4, 2\};$$

$$tcPD = (Sp == 3)?\ Tc3{:}Tc7;$$

$$tcQD = (Sq == 3)?\ Tc3{:}Tc7;$$

For the P or Q boundaries being filtered with a short symmetrical filter, position dependent threshold of lower magnitude is applied:

$$Tc3 = \{3, 2, 1\};$$

Following defining the threshold, filtered $p'_i$ and $q'_i$ sample values are clipped according to tcP and tcQ clipping values:

$$p_i'' = Clip3(p_i' + tcP_i,\ p_i' - tcP_i,\ p_i');$$

$$q_j'' = Clip3(q_j' + tcQ_j,\ q_j' - tcQ_j,\ q_j');$$

where $p'_i$ and $q'_i$ are filtered sample values, $p''_i$ and q"j are output sample value after the clipping and $tcP_i$ $tcP_i$ are clipping thresholds that are derived from the VVC tc parameter and $_{tc}$PD and $_{tc}$QD. The function Clip3 is a clipping function as it is specified in VVC.

2.4.8. Sub-Block Deblocking Adjustment

To enable parallel friendly deblocking using both long filters and sub-block deblocking the long filters is restricted to modify at most 5 samples on a side that uses sub-block deblocking (AFFINE or ATMVP or DMVR) as shown in the luma control for long filters. Additionally, the sub-block deblocking is adjusted such that that sub-block boundaries on an 8×8 grid that are close to a CU or an implicit TU boundary is restricted to modify at most two samples on each side.

Following applies to sub-block boundaries that not are aligned with the CU boundary.

```
If (mode block Q == SUBBLOCKMODE && edge !=0) {
  if (!(implicitTU && (edge == (64 / 4))))
    if (edge == 2 || edge == (orthogonalLength - 2) || edge == (56 / 4) ||
    edge == (72 / 4))
      Sp = Sq = 2;
    else
      Sp = Sq = 3;
  else
    Sp = Sq = bSideQisLargeBlk ? 5:3
}
```

Where edge equal to 0 corresponds to CU boundary, edge equal to 2 or equal to orthogonalLength-2 corresponds to sub-block boundary 8 samples from a CU boundary etc. Where implicit TU is true if implicit split of TU is used.

2.5. SAO

The input of SAO is the reconstructed samples after DB. The concept of SAO is to reduce mean sample distortion of a region by first classifying the region samples into multiple categories with a selected classifier, obtaining an offset for each category, and then adding the offset to each sample of the category, where the classifier index and the offsets of the region are coded in the bitstream. In HEVC and VVC, the region (the unit for SAO parameters signaling) is defined to be a CTU.

Two SAO types that can satisfy the requirements of low complexity are adopted in HEVC. Those two types are edge offset (EO) and band offset (BO), which are discussed in further detail below. An index of an SAO type is coded (which is in the range of [0, 2]). For EO, the sample classification is based on comparison between current samples and neighboring samples according to 1-D directional patterns: horizontal, vertical, 135° diagonal, and 45° diagonal.

Figure 11A:
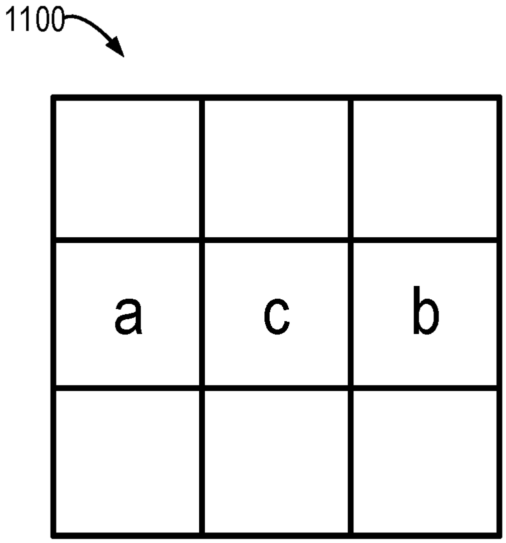
FIGS. 11A-11D illustrate example diagrams showing four 1-D directional patterns for EO sample classification.
Figure 11B:
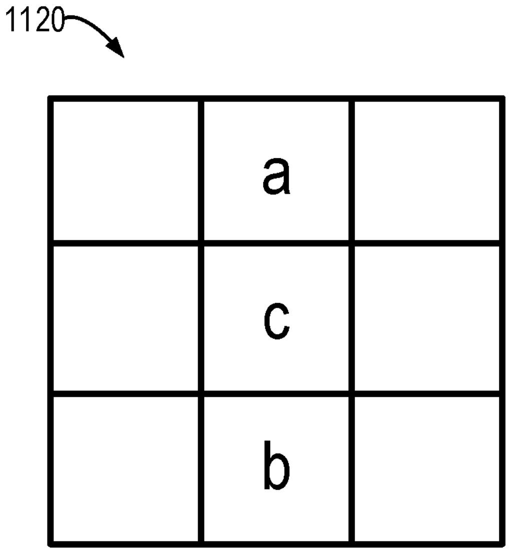
Figure 11C:
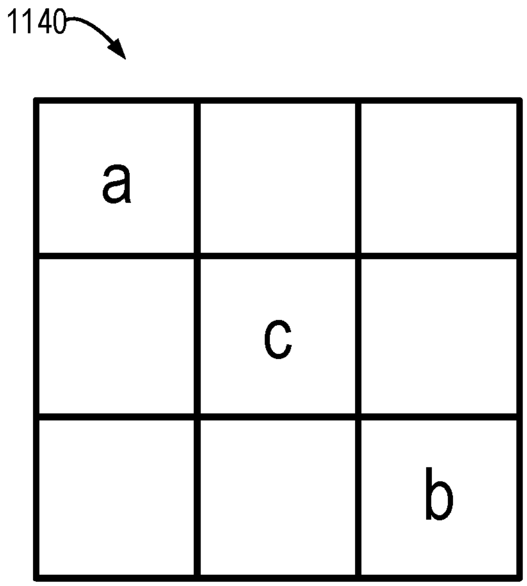
Figure 11D:
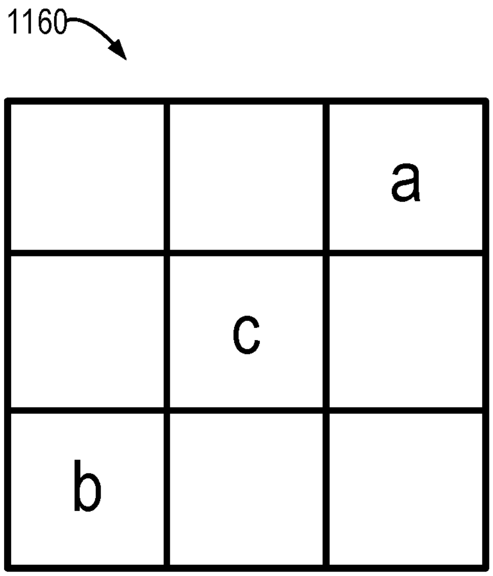

FIG. 11A illustrates an example diagram 1100 showing a 1-D directional pattern for EO sample classification with horizontal (EO class=0). FIG. 11B illustrates an example diagram 1120 showing a 1-D directional pattern for EO sample classification with vertical (EO class=1). FIG. 11C illustrates an example diagram 1140 showing a 1-D directional pattern for EO sample classification with 135° diagonal (EO class=2). FIG. 11D illustrates an example diagram 1160 showing a 1-D directional pattern for EO sample classification with 45° diagonal (EO class=3).

For a given EO class, each sample inside the CTB is classified into one of five categories. The current sample value, labeled as "c," is compared with its two neighbors along the selected 1-D pattern. The classification rules for each sample are summarized in Table 1. Categories 1 and 4 are associated with a local valley and a local peak along the selected 1-D pattern, respectively. Categories 2 and 3 are associated with concave and convex corners along the selected 1-D pattern, respectively. If the current sample does not belong to EO categories 1-4, then it is category 0 and SAO is not applied.

TABLE 3

Sample Classification Rules for Edge Offset

| Category | Condition |
|---|---|
| 1 | c<a and c<b |
| 2 | ( c < a && c==b) \|\|(c == a && c < b) |
| 3 | ( c > a && c==b) \|\|(c == a && c > b) |
| 4 | c > a && c > b |
| 5 | None of above |

2.6. Geometry Transformation-based Adaptive Loop Filter in JEM

The input of DB is the reconstructed samples after DB and SAO. The sample classification and filtering process are based on the reconstructed samples after DB and SAO.

In the JEM, a geometry transformation-based adaptive loop filter (GALF) with block-based filter adaption is applied. For the luma component, one among 25 filters is selected for each 2×2 block, based on the direction and activity of local gradients.

2.6.1. Filter Shape

Figure 12A:
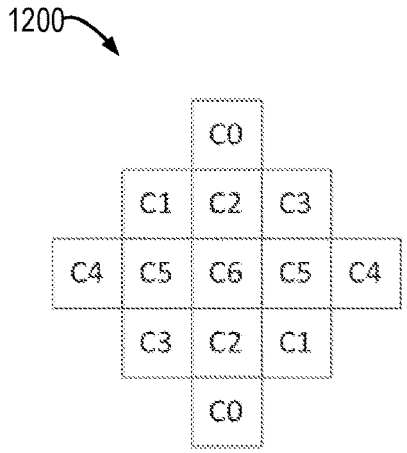
FIGS. 12A-12C illustrate example diagrams showing examples of GALF filter shapes.
Figure 12B:
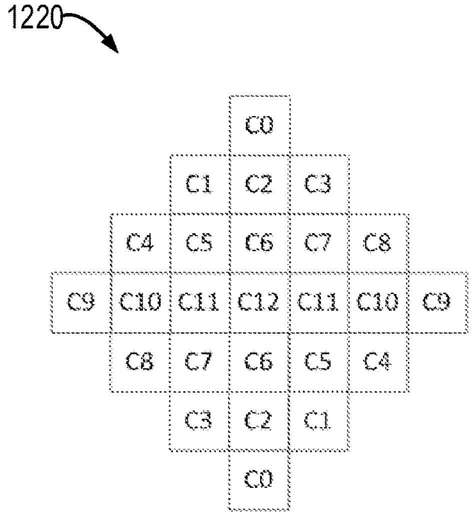
Figure 12C:
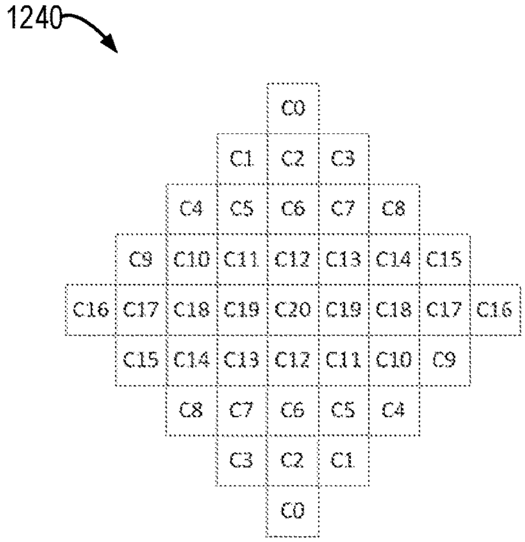

FIG. 12A illustrates an example diagram 1200 showing examples of GALF filter shapes with 5×5 diamond. FIG. 12B illustrates an example diagram 1220 showing examples of GALF filter shapes with 7×7 diamond. FIG. 12C illustrates an example diagram 1240 showing examples of GALF filter shapes with 9×9 diamond.

In the JEM, up to three diamond filter shapes (as shown in FIGS. 12A-12C) can be selected for the luma component. An index is signalled at the picture level to indicate the filter shape used for the luma component. Each square represents a sample, and Ci (i being 0~6 (left), 0~12 (middle), 0~20 (right)) denotes the coefficient to be applied to the sample. For chroma components in a picture, the 5×5 diamond shape is always used.

2.6.1.1. Block Classification

Each 2×2 block is categorized into one out of 25 classes. The classification index C is derived based on its directionality D and a quantized value of activity Â, as follows:

$$C = 5D + \hat{A}. \tag{1}$$

To calculate D and Â, gradients of the horizontal, vertical and two diagonal direction are first calculated using 1-D Laplacian:

$$g_v = \sum_{k=i-2}^{i+3} \sum_{l=j-2}^{j+3} V_{k,l},\ V_{k,l} = |2R(k, l) - R(k, l-1) - R(k, l+1)|, \tag{2}$$

$$g_h = \sum_{k=i-2}^{i+3} \sum_{l=j-2}^{j+3} H_{k,l},\ H_{k,l} = |2R(k, l) - R(k-1, l) - R(k+1, l)|, \tag{3}$$

$$g_{d1} = \sum_{k=i-2}^{i+3} \sum_{l=j-3}^{j+3} D1_{k,l}, \tag{4}$$

$$D1_{k,l} = |2R(k, l) - R(k-1, l-1) - R(k+1, l+1)|$$

$$g_{d2} = \sum_{k=i-2}^{i+3} \sum_{j=j-2}^{j+3} D2_{k,l}, \tag{5}$$

$$D2_{k,l} = |2R(k, l) - R(k-1, l+1) - R(k+1, l-1)|$$

Indices i and j refer to the coordinates of the upper left sample in the 2×2 block and R(i,j) indicates a reconstructed sample at coordinate (i,j).

Then D maximum and minimum values of the gradients of horizontal and vertical directions are set as:

$$g_{h,v}^{max} = \max(g_h, g_v),\ g_{h,v}^{min} = \min(g_h, g_v), \tag{6}$$

and the maximum and minimum values of the gradient of two diagonal directions are set as:

$$g_{d0,d1}^{max} = \max(g_{d0}, g_{d1}),\ g_{d0,d1}^{min} = \min(g_{d0}, g_{d1}), \tag{7}$$

To derive the value of the directionality D, these values are compared against each other and with two thresholds $t_1$ and $t_2$:

Step 1. If both $$g_{h,v}^{max} \le t_1 \cdot g_{h,v}^{min} \text{ and } g_{d0,d1}^{max} \le t_1 \cdot g_{d0,d1}^{min}$$

are true, D is set to 0.

Step 2. If $$g_{h,v}^{max}/g_{h,v}^{min} > g_{d0,d1}^{max}/g_{d0,d1}^{min},$$

continue from Step 3; otherwise continue from Step 4.

Step 3. If $$g_{h,v}^{max} > t_2 \cdot g_{h,v}^{min},$$

D is set to 2; otherwise D is set to 1.

Step 4. If $$g_{d0,d1}^{max} > t_2 \cdot g_{d0,d1}^{min},$$

D is set to 4; otherwise D is set to 3.

The activity value A is calculated as:

$$A = \sum_{k=i-2}^{i+3} \sum_{l=j-2}^{j+3} (V_{k,l} + H_{k,l}). \tag{8}$$

A is further quantized to the range of 0 to 4, inclusively, and the quantized value is denoted as Â.

For both chroma components in a picture, no classification method is applied, i.e. a single set of ALF coefficients is applied for each chroma component.

2.6.1.2. Geometric Transformations of Filter Coefficients

Figure 13A:
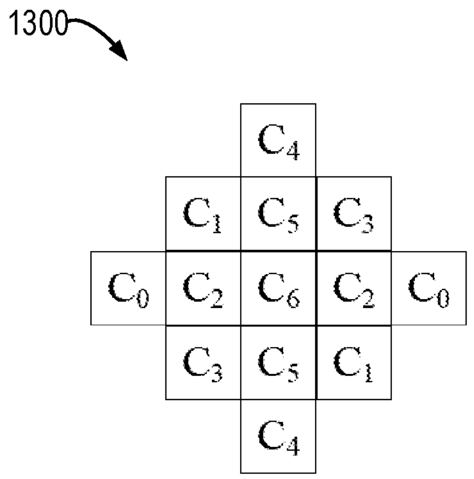
FIGS. 13A-13C illustrate example diagrams showing examples of relative coordinator for the 5×5 diamond filter support.
Figure 13B:
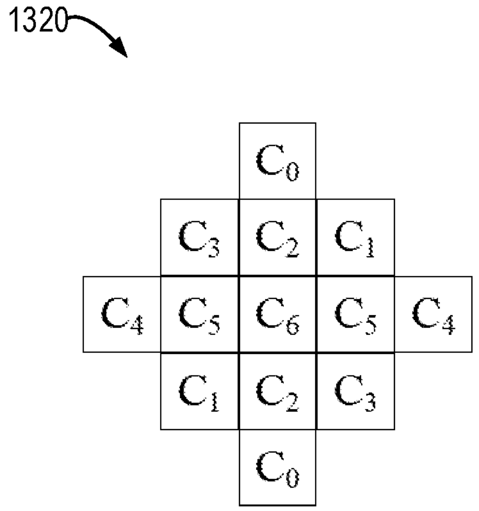
Figure 13C:
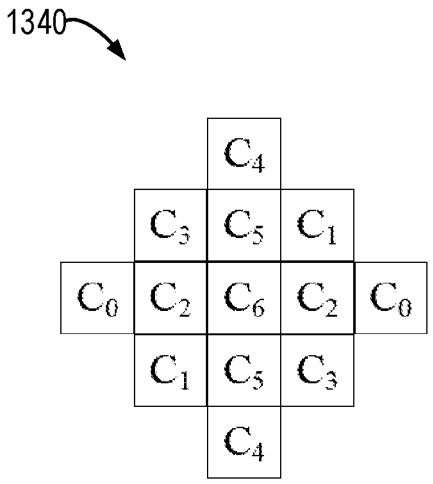

FIG. 13A illustrates an example diagram 1300 showing relative coordinator for the 5×5 diamond filter support (diagonal). FIG. 13B illustrates an example diagram 1320 showing relative coordinator for the 5×5 diamond filter support (vertical flip). FIG. 13C illustrates an example diagram 1340 showing relative coordinator for the 5×5 diamond filter support (rotation).

Before filtering each 2×2 block, geometric transformations such as rotation or diagonal and vertical flipping are applied to the filter coefficients f (k,l), which is associated with the coordinate (k,l), depending on gradient values calculated for that block. This is equivalent to applying these transformations to the samples in the filter support region. The idea is to make different blocks to which ALF is applied more similar by aligning their directionality.

Three geometric transformations, including diagonal, vertical flip and rotation are introduced:

$$\text{Diagonal:} f_D(k, l) = f(l, k), \tag{9}$$

$$\text{Vertical flip:} f_V(k, l) = f(k, K-l-1),$$

$$\text{Rotation:} f_R(k, l) = f(K-l-1, k).$$

where K is the size of the filter and 0≤k, l≤K−1 are coefficients coordinates, such that location (0,0) is at the upper left corner and location (K−1, K−1) is at the lower right corner. The transformations are applied to the filter coefficients f (k,l) depending on gradient values calculated for that block. The relationship between the transformation and the four gradients of the four directions are summarized in Table 4. FIGS. 12A-12C show the transformed coefficients for each position based on the 5×5 diamond.

TABLE 4

Mapping of the gradient calculated for one block and the transformations

| Gradient values | Transformation |
|---|---|
| $g_{d2} < g_{d1}$ and $g_h < g_v$ | No transformation |
| $g_{d2} < g_{d1}$ and $g_v < g_h$ | Diagonal |
| $g_{d1} < g_{d2}$ and $g_h < g_v$ | Vertical flip |
| $g_{d1} < g_{d2}$ and $g_v < g_h$ | Rotation |

2.6.1.3. Filter Parameters Signalling

In the JEM, GALF filter parameters are signalled for the first CTU, i.e., after the slice header and before the SAO parameters of the first CTU. Up to 25 sets of luma filter coefficients could be signalled. To reduce bits overhead, filter coefficients of different classification can be merged. Also, the GALF coefficients of reference pictures are stored and allowed to be reused as GALF coefficients of a current picture. The current picture may choose to use GALF coefficients stored for the reference pictures and bypass the GALF coefficients signalling. In this case, only an index to one of the reference pictures is signalled, and the stored GALF coefficients of the indicated reference picture are inherited for the current picture.

To support GALF temporal prediction, a candidate list of GALF filter sets is maintained. At the beginning of decoding a new sequence, the candidate list is empty. After decoding one picture, the corresponding set of filters may be added to the candidate list. Once the size of the candidate list reaches the maximum allowed value (i.e., 6 in current JEM), a new set of filters overwrites the oldest set in decoding order, and that is, first-in-first-out (FIFO) rule is applied to update the candidate list. To avoid duplications, a set could only be added to the list when the corresponding picture doesn't use GALF temporal prediction. To support temporal scalability, there are multiple candidate lists of filter sets, and each candidate list is associated with a temporal layer. More specifically, each array assigned by temporal layer index (TempIdx) may compose filter sets of previously decoded pictures with equal to lower TempIdx. For example, the k-th array is assigned to be associated with TempIdx equal to k, and it only contains filter sets from pictures with TempIdx smaller than or equal to k. After coding a certain picture, the filter sets associated with the picture will be used to update those arrays associated with equal or higher TempIdx.

Temporal prediction of GALF coefficients is used for inter coded frames to minimize signalling overhead. For intra frames, temporal prediction is not available, and a set of 16 fixed filters is assigned to each class. To indicate the usage of the fixed filter, a flag for each class is signalled and if required, the index of the chosen fixed filter. Even when the fixed filter is selected for a given class, the coefficients of the adaptive filter f (k,l) can still be sent for this class in which case the coefficients of the filter which will be applied to the reconstructed image are sum of both sets of coefficients.

The filtering process of luma component can controlled at CU level. A flag is signalled to indicate whether GALF is applied to the luma component of a CU. For chroma component, whether GALF is applied or not is indicated at picture level only.

2.6.1.4. Filtering Process

At decoder side, when GALF is enabled for a block, each sample R(i,j) within the block is filtered, resulting in sample value R'(i,j) as shown below, where L denotes filter length, $f_{m,n}$ represents filter coefficient, and f (k,l) denotes the decoded filter coefficients.

$$R'(i,j)=\sum_{k=-L/2}^{L/2}\sum_{l=-L/2}^{L/2}f(k,l)\times R(i+k,j+l) \tag{10}$$

Figure 14:
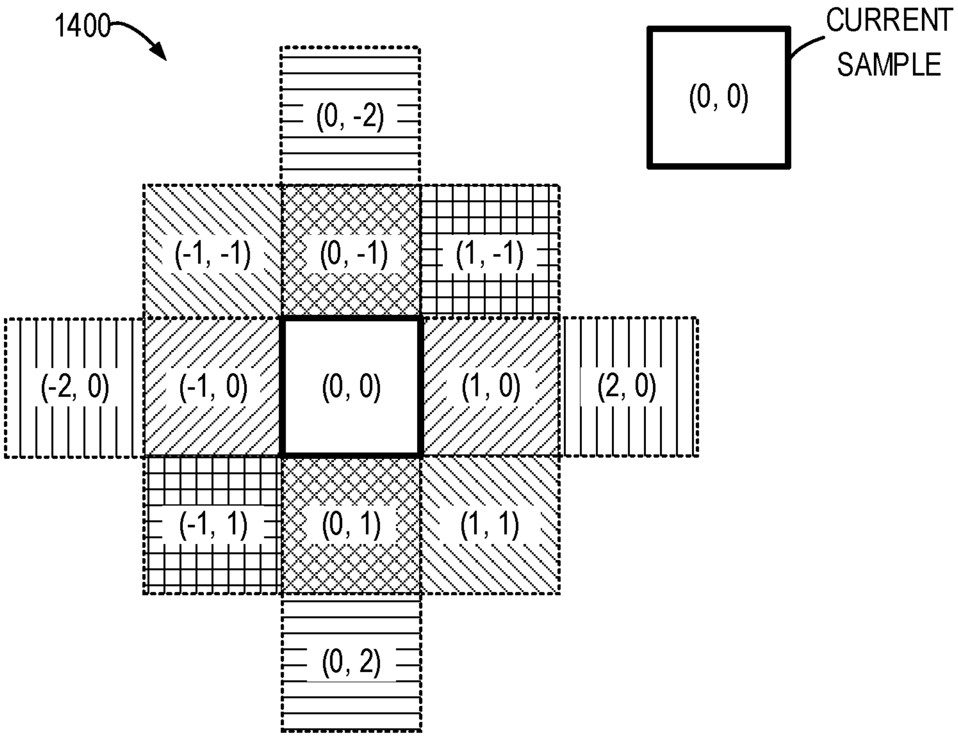
FIG. 14 illustrates an example diagram showing examples of relative coordinates for the 5×5 diamond filter support.

FIG. 14 illustrates an example diagram 1400 showing examples of relative coordinates for the 5×5 diamond filter support. FIG. 14 shows an example of relative coordinates used for 5×5 diamond filter support supposing the current sample's coordinate (i,j) to be (0, 0). Samples in different coordinates filled with the same color are multiplied with the same filter coefficients.

2.7. Geometry Transformation-based Adaptive Loop Filter (GALF) in VVC 2.7.1. GALF in VTM-4

In VTM4.0, the filtering process of the Adaptive Loop Filter, is performed as follows:

$$O(x,y)=\sum_{(i,j)}w(i,j).I(x+i,y+j), \tag{11}$$

where samples I(x+i, y+j) are input samples, O(x,y) is the filtered output sample (i.e. filter result), and w(i,j) denotes the filter coefficients. In practice, in VTM4.0 it is implemented using integer arithmetic for fixed point precision computations:

$$O(x,y)=\left(\sum_{i=-\frac{L}{2}}^{\frac{L}{2}}\sum_{j=-\frac{L}{2}}^{\frac{L}{2}}w(i,j).I(x+i,y+j)+64\right)\gg 7, \tag{12}$$

where L denotes the filter length, and where w(i,j) are the filter coefficients in fixed point precision.

The current design of GALF in VVC has the following major changes compared to that in JEM:

1) The adaptive filter shape is removed. Only 7×7 filter shape is allowed for luma component and 5×5 filter shape is allowed for chroma component.
2) Signaling of ALF parameters in removed from slice/picture level to CTU level.
3) Calculation of class index is performed in 4×4 level instead of 2×2. In addition, subsampled Laplacian calculation method for ALF classification is utilized. More specifically, there is no need to calculate the horizontal/vertical/45 diagonal/135 degree gradients for each sample within one block. Instead, 1:2 subsampling is utilized.

2.8. Non-Linear ALF in Current VVC 2.8.1. Filtering Reformulation

Equation (11) can be reformulated, without coding efficiency impact, in the following expression:

$$O(x,y)=I(x,y)+\sum_{(i,j)\neq(0,0)}w(i,j).(I(x+i,y+j)-I(x,y)), \tag{13}$$

where w(i,j) are the same filter coefficients as in equation (11) [excepted w(0, 0) which is equal to 1 in equation (13) while it is equal to $1-\Sigma_{(i,j)\neq(0,0)}w(i,j)$ in equation (11)]. Using this above filter formula of (13), VVC introduces the non-linearity to make ALF more efficient by using a simple clipping function to reduce the impact of neighbor sample values (I(x+i, y+j)) when they are too different with the current sample value (I(x,y)) being filtered.

More specifically, the ALF filter is modified as follows:

$$O'(x,y)=I(x,y)+\sum_{(i,j)\neq(0,0)}w(i,j).K(I(x+i,y+j)-I(x,y),k(i,j)), \tag{14}$$

where K(d,b)=min(b, max(−b,d)) is the clipping function, and k(i,j) are clipping parameters, which depends on the (i,j) filter coefficient. The encoder performs the optimization to find the best k(i,j).

In some implementation, the clipping parameters k(i,j) are specified for each ALF filter, one clipping value is signaled per filter coefficient. It means that up to 12 clipping values can be signalled in the bitstream per Luma filter and up to 6 clipping values for the Chroma filter. In order to limit the signaling cost and the encoder complexity, only 4 fixed values which are the same for INTER and INTRA slices are used.

Because the variance of the local differences is often higher for Luma than for Chroma, two different sets for the Luma and Chroma filters are applied. The maximum sample value (here 1024 for 10 bits bit-depth) in each set is also introduced, so that clipping can be disabled if it is not necessary.

The sets of clipping values are provided in the Table 5. The 4 values have been selected by roughly equally splitting, in the logarithmic domain, the full range of the sample values (coded on 10 bits) for Luma, and the range from 4 to 1024 for Chroma.

More precisely, the Luma table of clipping values have been obtained by the following formula:

$$AlfClip_L=\left\{\text{round}\left(\left((M)^{\frac{1}{N}}\right)^{N-n+1}\right)\text{ for } n\in 1\ \ldots\ N\right]\right\}, \tag{15}$$

with $M=2^{10}$ and $N=4$.

Similarly, the Chroma tables of clipping values is obtained according to the following formula:

$$AlfClip_C=\left\{\text{round}\left(A.\left(\left(\frac{M}{A}\right)^{\frac{1}{N-1}}\right)^{N-n}\right)\text{ for } n\in 1\ \ldots\ N\right]\right\}, \tag{16}$$

with $M=2^{10}$, $N=4$ and $A=4$.

TABLE 5

| Authorized clipping values | |
|---|---|
| | INTRA/INTER tile group |
| LUMA | { 1024, 181, 32, 6 } |
| CHROMA | { 1024, 161, 25, 4 } |

The selected clipping values are coded in the "alf_data" syntax element by using a Golomb encoding scheme corresponding to the index of the clipping value in the above Table 5. This encoding scheme is the same as the encoding scheme for the filter index.

2.9. Convolutional Neural Network-Based Loop Filters for Video Coding 2.9.1. Convolutional Neural Networks In deep learning, a convolutional neural network (CNN, or ConvNet) is a class of deep neural networks, most commonly applied to analyzing visual imagery. They have very successful applications in image and video recognition/processing, recommender systems, image classification, medical image analysis, natural language processing.

CNNs are regularized versions of multilayer perceptrons. Multilayer perceptrons usually mean fully connected networks, that is, each neuron in one layer is connected to all neurons in the next layer. The "fully-connectedness" of these networks makes them prone to overfitting data. Typical ways of regularization include adding some form of magnitude measurement of weights to the loss function. CNNs take a different approach towards regularization: they take advantage of the hierarchical pattern in data and assemble more complex patterns using smaller and simpler patterns. Therefore, on the scale of connectedness and complexity, CNNs are on the lower extreme.

CNNs use relatively little pre-processing compared to other image classification/processing algorithms. This means that the network learns the filters that in traditional algorithms were hand-engineered. This independence from prior knowledge and human effort in feature design is a major advantage.

2.9.2. Deep Learning for Image/Video Coding

Deep learning-based image/video compression typically has two implications: end-to-end compression purely based on neural networks and traditional frameworks enhanced by neural networks. The first type usually takes an auto-encoder like structure, either achieved by convolutional neural networks or recurrent neural networks. While purely relying on neural networks for image/video compression can avoid any manual optimizations or hand-crafted designs, compression efficiency may be not satisfactory. Therefore, works distributed in the second type take neural networks as an auxiliary, and enhance traditional compression frameworks by replacing or enhancing some modules. In this way, they can inherit the merits of the highly optimized traditional frameworks. For example, a fully connected network for the intra prediction is proposed. In addition to intra prediction, deep learning is also exploited to enhance other modules. For example, the in-loop filters of HEVC with a convolutional neural network is replaced and promising results are achieved. Neural networks are applied to improve the arithmetic coding engine.

2.9.3. Convolutional Neural Network Based In-Loop Filtering

In lossy image/video compression, the reconstructed frame is an approximation of the original frame, since the quantization process is not invertible and thus incurs distortion to the reconstructed frame. To alleviate such distortion, a convolutional neural network could be trained to learn the mapping from the distorted frame to the original frame. In practice, training must be performed prior to deploying the CNN-based in-loop filtering.

2.9.3.1. Training

The purpose of the training processing is to find the optimal value of parameters including weights and bias.

First, a codec (e.g. HM, JEM, VTM, etc.) is used to compress the training dataset to generate the distorted reconstruction frames.

Then the reconstructed frames are fed into the CNN and the cost is calculated using the output of CNN and the groundtruth frames (original frames). Commonly used cost functions include SAD (Sum of Absolution Difference) and MSE (Mean Square Error). Next, the gradient of the cost with respect to each parameter is derived through the back propagation algorithm. With the gradients, the values of the parameters can be updated. The above process repeats until the convergence criteria is met. After completing the training, the derived optimal parameters are saved for use in the inference stage.

2.9.3.2. Convolution Process

During convolution, the filter is moved across the image from left to right, top to bottom, with a one-pixel column change on the horizontal movements, then a one-pixel row change on the vertical movements. The amount of movement between applications of the filter to the input image is referred to as the stride, and it is almost always symmetrical in height and width dimensions. The default stride or strides in two dimensions is (1,1) for the height and the width movement.

Figure 15A:
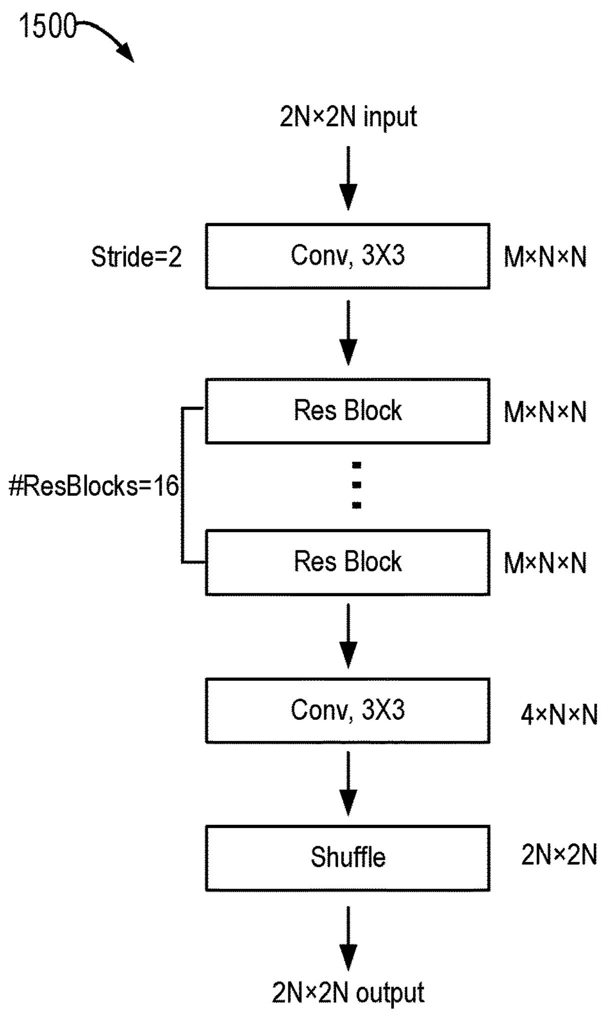
FIG. 15A illustrates an example diagram showing Architecture of the proposed CNN filter.
Figure 15B:
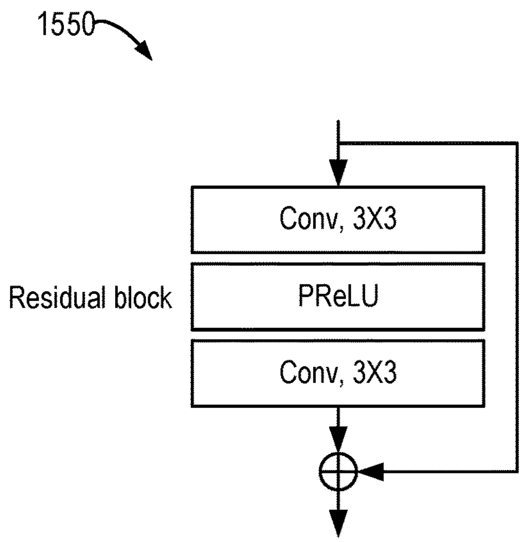
FIG. 15B illustrates an example diagram showing a construction of ResBlock (residual block) in the CNN filter.

FIG. 15A illustrates an example diagram 1500 showing Architecture of the proposed CNN filter. FIG. 15B illustrates an example diagram 1550 showing a construction of ResBlock (residual block) in the CNN filter. In most of deep convolutional neural networks, residual blocks are utilized as the basic module and stacked several times to construct the final network wherein in one example, the residual block is obtained by combining a convolutional layer, a ReLU/PRELU activation function and a convolutional layer as shown in FIG. 15B.

2.9.3.3. Inference

During the inference stage, the distorted reconstruction frames are fed into CNN and processed by the CNN model whose parameters are already determined in the training stage. The input samples to the CNN can be reconstructed samples before or after DB, or reconstructed samples before or after SAO, or reconstructed samples before or after ALF.

3. Problems

The current NN filter has the following problems:

1. The prior art design of NN filter is only applied after the reconstruction of all blocks before in-loop filtering processes within a slice. Therefore, the impact of reduced distortion due to NN filter is not taken into consideration during the rate-distortion optimization (RDO) process, such as intra mode selection, partitioning selection, intra mode selection, inter mode selection, transform core selection, etc. The coding performance is sub-optimal considering:
   a. The best mode (e.g., coding method/partitioning sizes) of current block selected in the RDO process could be wrong since the distortion is calculated without NN filter being applied.
   b. The reconstruction and associated coded information of current block has big impact on coding of the subsequent blocks (e.g., due to intra prediction, or motion prediction). If the current block doesn't select the best mode, then the coding performance of sub-sequence block will also be sub-optimal.

4. Detailed Description

The detailed embodiments below should be considered as examples to explain general concepts. These embodiments should not be interpreted in a narrow way. Furthermore, these embodiments can be combined in any manner.

To solve the above problem, it is proposed to take the NN filter into consideration during the rate-distortion optimization (RDO) process. This disclosure elaborates how to extend RDO purview with NN filter models, how to utilize NN filter models to select mode (e.g. intra mode, partitioning mode, inter mode or transform core), how to control the usage of NN filter models.

In the disclosure, a NN filter can be any kind of NN filter, such as a convolutional neural network (CNN) filter; alternatively, it could also be applied to non-NN based filters. In the following discussion, a NN filter may also be referred to as a CNN filter.

In the following discussion, a video unit may be a sequence, a picture, a slice, a tile, a brick, a subpicture, a CTU/CTB, a CTU/CTB row, one or multiple CUs/CBs, one ore multiple CTUs/CTBs, one or multiple VPDU (Virtual Pipeline Data Unit), a sub-region within a picture/slice/tile/brick. A father video unit represents a unit larger than the video unit. Typically, a father unit will contain several video units. E.g., when the video unit is CTU, the father unit could be slice, CTU row, multiple CTUs, etc.

The matrix based intra prediction is denoted as MIP. The intra sub partition is denoted as ISP. The multiple reference line is denoted as MRL. The merge with MVD is denoted as MMVD. The combine intra and inter prediction is denoted as CIIP. The geometric partitioning mode is denoted as GPM. The quad-tree is denoted as QT. The binary-tree is denoted as BT. The ternary-tree is denoted as TT. The cross-component SAO is denoted as CCSAO. The cross-component ALF is denoted as CCALF.

The width and height of a video unit are denoted as W and H, respectively.

On Integration of the NN Filter Models During the RDO Process

1. It is proposed that at least one NN model which is used for NN-filtering may be included in an encoder.
   a. In one example, the NN model may be used in the RDO process.
   b. In one example, the NN model may not be included in a compatible decoder.
   c. In one example, the NN model may be simpler than another NN model which is used for NN-filtering in a compatible decoder.
2. The NN filter models may be combined with the other filter models in an encoder.
   a. In one example, the NN filter models may be different with the NN filter.
   b. In one example, the NN model may be applied before the other filter models.
   c. In one example, the NN model may be applied after the other filter models.
   d. In one example, the other filter models may be CNN filter models, deblock, SAO, ALF, CCSAO, CCALF.
   e. In one example, the NN model and/or the other filter models may be applied according to the certain or adaptive order.
      i. In one example, deblock, CNN filter, SAO and ALF are applied in sequence.
   f. In one example, the order of applying the NN model and/or the other filter models may be dependent on the coding modes/statistics of the video unit (e.g., prediction modes, qp, temporal layer, slice type, etc.).
   g. In one example, whether to and/or how to utilize the NN model and/or the other filter models may be dependent on the coding modes/statistics of the video unit (e.g., prediction modes, qp, temporal layer, slice type, etc.).
3. The mode decision process (e.g., the RDO process) may be dependent on NN filter models, e.g., according to the filtered reconstruction information due to NN filter models.
   a. In one example, NN filter models may be utilized when determining the best intra prediction mode (e.g., with the RDO of intra mode selection).
   b. In one example, NN filter models may be utilized when determining the best coded intra methods (e.g., whether to apply MIP, ISP, MRL).
   c. In one example, NN filter models may be utilized with the RDO of inter mode selection (e.g., whether to use AMVP or skip or merge mode).
   d. In one example, NN filter models may be utilized when determining the best coded inter methods (e.g., whether to code the block with affine motion model or translation motion model, whether to apply MMVD, CIIP, GPM etc. al).
   e. In one example, NN filter models may be utilized with the RDO of partitioning mode selection (e.g., whether to apply QT, BT, TT, Non-Split etc. al).
   f. In one example, NN filter models may be utilized with the RDO of transform core selection.
   g. In one example, NN filter models may be utilized when determining the best coded methods, including intra and inter methods (e.g., whether to apply intra (MIP, ISP etc. al) or inter (MMVD, AMVP, skip etc. al)).
   h. In one example, NN filter models may be utilized whenever the distortion is calculated.
      i. Alternatively, NN filter models may be utilized whenever the distortion is calculated. (For example, when the distortion is calculated with the SSE/MSE/SSIM/MS-SSIM/IW-SSIM matrix).
      ii. Alternatively, NN filter models may NOT be utilized when the distortion is calculated with certain matrix (For example, when the distortion is calculated with the SAD/SATD matrix.
4. The distortion or cost calculated in the mode decision process (e.g., the RDO process) may be revised so that the impact of NN filtering process is taken into consideration.
   a. In one example, the distortion or cost may be calculated according to the certain matrix (e.g., SSE/MSE/SSIM/MS-SSIM/IW-SSIM matrix).
   b. In one example, instead of using the distortion calculated between the reconstruction before in-loop filtering methods (denoted by non-filtered reconstruction) and original samples, it is proposed to apply the NN filtering process to the reconstruction to get a NN-filtered reconstruction and calculate the distortion between the NN-filtered reconstruction and original samples.
   c. In one example, two distortions are calculated, one is between non-filtered reconstruction and original samples, and the other is between the NN-filtered reconstruction and original samples.
      i. Alternatively, furthermore, a function of the two distortions is invoked and the output of the function is set to the real distortion associated with the current mode to be checked during the RDO process.
   d. In one example, multiple distortions are calculated, one is between non-filtered reconstruction and original samples, others are between filtered reconstruction and original samples are calculated.

i. In one example, filtered reconstruction samples may be filtered by the NN filter models.

ii. In one example, filtered reconstruction samples may be filtered by the other filter models.

iii. In one example, filtered reconstruction samples may be filtered by the NN filter models and/or the other filter models.

iv. Alternatively, furthermore, a function of the distortions is invoked and the output of the function is set to the real distortion associated with the current mode to be checked during the RDO process.

e. In one example, two distortions are calculated, one is between the filtered reconstruction and original samples, and the other is between the NN-filtered reconstruction and original samples. The filtered reconstruction means the reconstruction which is obtained with the other filters, but before the NN-filter.

i. Alternatively, furthermore, a function of the two distortions is invoked and the output of the function is set to the real distortion associated with the current mode to be checked during the RDO process.

f. In one example, the distortion is first calculated between the non-filtered reconstruction and original samples, and then scaled by a factor.

i. In one example, the factor is a constant between 0 and 1.0.

ii. In one example, the factor is dependent on the current mode to be checked during the RDO process.

iii. In one example, the factor is dependent on the lambda.

iv. In one example, the factor is dependent on the color components.

On Simplification of the NN Filter Models in the RDO Process

5. The filtering process applied to reconstruction video units during the RDO process may be different from that applied in the in-loop filtering process/post-processing process.

a. In one example, the filter models may be different.

b. In one example, the number of filter models may be different.

c. In one example, the network structure may be different.

d. In one example, the filtering process during the RDO process may be only applied to certain sub-regions of one video unit.

i. In one example, it may be only applied to boundary samples of the video unit.

ii. In one example, it may be only applied to inner samples of the video unit.

e. In one example, the filtering process during the RDO process may be only applied to a down-sampled version of the video unit.

6. The NN filter models used in RDO process may be the same as the NN filter models in the decoder side.

a. In one example, the number of ResBlock is the same as the decoder.

7. The NN filter models used in RDO process may be a simplified version of the models used in the decoder side.

a. In one example, the depth of the NN filter models may be different.

i. In one example, the NN filter models used in RDO process may have a shallower depth.

b. In one example, the feature maps of the NN filter models may be different.

i. In one example, the NN filter models used in RDO process may have less feature maps.

c. In one example, the number of ResBlock of the NN filter models may be different.

i. In one example, the number of ResBlock of the NN filter models used in RDO process may be less.

ii. In one example, the number of ResBlock is 1, 2, 3, 4, 5, 6.

d. In one example, convolution kernel of the NN filter models may be different.

On Usage of the NN Filter Models in the RDO Process

8. Whether to and/or how to utilize the NN filter models in RDO process may be dependent on the coding modes/statistics of the video unit (e.g., prediction modes, qp, temporal layer, slice type, etc.).

a. In one example, it may be dependent on the prediction modes, qp, temporal layer, slice type, etc.)

b. In one example, it may be dependent on the quantization step.

c. In one example, it may be dependent on the temporal layer.

d. In one example, it may be dependent on the slice type.

e. In one example, it may be dependent on the block size of the video unit.

f. In one example, it may be dependent on the color components.

g. In one example, it may be dependent on the rate distortion cost without NN filter model.

5. Embodiment

5.1. Embodiment #1

In this implementation, the convolutional neural network-based in-loop filtering with adaptive model selection (DAM) is extended to the rate distortion optimization (RDO) process. And the number of residual blocks in DAM is reduced to 4. The DAM is applied to the coding unit level to select the best partitioning structure based on the RDO criterion. The rate distortion cost could be formulated as:

$$J = D + \text{lambda} * R$$

where D denotes the minimum value of distortion with DAM and without DAM.

Before applying the DAM, the cost JA of partitioning mode A and the cost JB of partitioning mode B are checked. When meeting the following condition, the DAM is skipped.

$$J_A > f_0 * J_B || J_B > f_1 * J_A$$

Where the $f_0$ and $f_1$ are parameters.

The embodiments of the present disclosure are related to machine learning model-based coding tool selection. As used herein, the term "machine learning model" can also be referred to as a "machine learning model". The machine learning model may comprise any kinds of model, such as a neural network (NN) model (also referred to as a "NN filter" or "NN filter model"), a convolutional neural network (CNN) model, or the like. Alternatively, in some embodiments, the machine learning model further comprises non-NN based models or non-NN based filters. Scope of the present disclosure is not limited in this regard.

As used herein, the term "video unit" or "video block" may be a sequence, a picture, a slice, a tile, a brick, a subpicture, a coding tree unit (CTU)/coding tree block (CTB), a CTU/CTB row, one or multiple coding units (CUs)/coding blocks (CBs), one ore multiple CTUs/CTBs, one or multiple Virtual Pipeline Data Unit (VPDU), a sub-region within a picture/slice/tile/brick. As used herein, the term "father video unit" may represent a unit larger than the video unit. A father unit will contain several video units. For example, if the video unit is a CTU, the father unit may be a slice, CTU row, multiple CTUs, etc.

Figure 16:
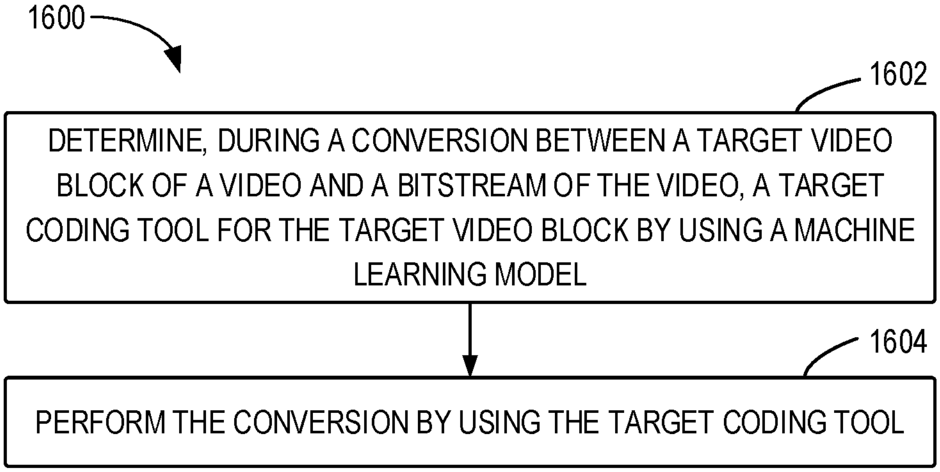
FIG. 16 illustrates a flowchart of a method for video processing in accordance with some embodiments of the present disclosure.

FIG. 16 illustrates a flowchart of a method 1600 for video processing in accordance with some embodiments of the present disclosure. The method 1600 may be implemented during a conversion between a target video block of a video and a bitstream of the video. As shown in FIG. 16, at block 1602, a target coding tool for the target video block is determined by using a machine learning model. As used herein, the term "target coding tool" may represent a coding tool to be used on the target video block during the conversion. The process of determining the target coding tool may be referred to as a "determination of coding tool" or "coding tool decision process". The coding tool may be a coding mode or a coding method.

Compared with the conventional solution where a coding tool is selected without taking the machine learning model into consideration, the proposed machine learning model-based method can select a proper coding tool for the video block. In this way, the coding effectiveness and coding efficiency can be improved.

At block 1604, the conversion is performed by using the target coding tool. In some embodiments, the conversion may include encoding the target video block into the bitstream. Alternatively, or in addition, the conversion may include decoding the target video block from the bitstream.

In some embodiments, the machine learning model is used for neural network (NN) filtering during the determination of the target coding tool. For example, the machine learning model may be used for NN filtering during a rate-distortion optimization (RDO) process. That is, the machine learning model may be applied in the RDO process on the target video block to obtain the target coding tool.

In some embodiments, the machine learning model is obtained by an encoder used during the conversion. For example, the machine learning model may be stored in the encoder. For another example, the machine learning model may be stored in an external storage device communicatively connected with the encoder. The encoder may obtain the machine learning model from the storage device.

In some embodiments, the machine learning model may not be obtained by a decoder used during the conversion. For example, the machine learning model may not be stored by the decoder. In other words, the machine learning model may not be included in a compatible decoder.

In some embodiments, the machine learning model comprises a NN model. Alternatively, or in addition, the machine learning model may comprise a convolutional neural network (CNN) model as shown in FIG. 15A, or a non-NN based model. It is to be understood that these example machine learning models are only for the purpose of illustration, without suggesting any limitation. Scope of the present disclosure is not limited in the regard.

In some embodiments, a further model different from the machine learning model may be obtained by an encoder used during the conversion. For example, the further model may be stored in the encoder or stored in a storage device communicatively connected with the encoder. Examples of the further model include but not limited to the following: a convolutional neural network (CNN) model, a deblocking filter, a sample adaptive offset (SAO) filter, an adaptive loop filter (ALF), a cross-component SAO (CCSAO) filter, or a cross-component ALF (CCALF). It is to be understood that these example further models are only for the purpose of illustration, without suggesting any limitation. Scope of the present disclosure is not limited in the regard.

In some embodiments, the machine learning model may be combined with the further model. Alternatively, or in addition, in some embodiments, the machine learning model may be applied before or after the further model.

In some embodiments, at least one of the machine learning model or the further model may be applied to the target video block based on a filtering order. For example, the filtering order comprises an order as follows: a deblocking filter, a convolutional neural network (CNN) filter, a sample adaptive offset (SAO) filter, and an adaptive loop filter (ALF). In other words, deblock, CNN filter, SAO and ALF may be applied in sequence.

In some embodiments, the filtering order is predefined. Alternatively, or in addition, in some embodiments, the filtering order is determined based on coding information of the target video block.

In some embodiments, the coding information comprises a coding mode of the target video block. Alternatively, or in addition, in some embodiments, the coding information comprises coding statistics of the target video block.

In some embodiments, examples of coding information include but not limited to: a prediction mode of the target video block, a quantization parameter (QP) of the target video block, a temporal layer of the target video block, or a slice type of the target video block. It is to be understood that the example coding information is only for the purpose of illustration, without suggesting any limitation. Scope of the present disclosure is not limited in the regard.

In some embodiments, first information regarding a utilization of at least one of the machine learning model or the further model is determined based on coding information of the target video block. Examples of the coding information have been described above, and thus will not be repeated here.

In some embodiments, the first information comprises whether to use the at least one of the machine learning model or the further model. Alternatively, or in addition, in some embodiments, the first information comprises how to use the at least one of the machine learning model or the further model.

In some embodiments, at block 1602, filtered reconstruction information of the target video block may be determined by using the machine learning model. The target coding tool may be determined based on the filtered reconstruction information.

In some embodiments, at block 1602, a target intra mode may be determined as the target coding tool by using the machine learning model. For example, the machine learning model may be used in determining the target intra prediction mode with the RDO of intra mode selection.

In some embodiments, at block 1602, a target coded intra tool is determined by using the machine learning model as the target coding tool. The target coded intra tool may be selected from any suitable coded intra tools, including but not limited to a mixed based intra prediction (MIP) tool, an intra sub partition (ISP) tool or a multiple reference line (MRL) tool. For example, the machine learning model may be utilized in determining whether to apply MIP, ISP or MRL.

In some embodiments, at block 1602, a target inter mode is determined by using the machine learning model as the target coding tool. For example, the target inter mode may be selected from an advanced motion vector predication (AMVP) mode, a skip mode, a merge mode or any other suitable inter mode. In other words, the machine learning model may be utilized with the RDO of inter mode selection.

In some embodiments, at block 1602, a target coded inter tool is determined by using the machine learning model as the target coding tool. For example, the target coded inter tool may be selected from any suitable coded inter tools, including but not limited to an affine motion mode, a translation motion mode, a merge with motion vector difference (MMVD) tool, a combine intra and inter prediction (CIIP) tool, or a geometric partitioning mode (GPM). That is, the machine learning model may be utilized in determining whether to code the block with affine motion mode or translation motion mode, or whether to apply MMVD, CIIP, GPM or the like.

In some embodiments, at block 1602, a target partitioning mode is determined by using the machine learning model as the target coding tool. For example, the target partitioning mode may be selected from a quad-tree (QT) partitioning mode, a binary-tree (BT) partitioning mode, a ternary-tree (TT) partitioning mode, a non-split mode, or any other suitable partitioning mode. For example, the machine learning model may be utilized with the RDO of partitioning mode selection.

In some embodiments, at block 1602, a target transform core is determined by using the machine learning model as the target coding tool. For example, the machine learning model may be utilized with the RDO of transform core selection.

In some embodiments, at block 1602, a target coded tool is determined by using the machine learning model as the target coding tool. The target coded tool may comprise an intra tool or an inter tool. The intra tool may comprise any suitable intra coding tool, including but not limited to a mixed based intra prediction (MIP) tool or an intra sub partition (ISP) tool. The inter tool may comprise any suitable inter coding tool, including but not limited to a merge with motion vector difference (MMVD) tool, an advanced motion vector predication (AMVP) tool or a skip mode.

Alternatively, or in addition, in some embodiments, if a first distortion of the target video block is determined, the target coding tool may be determined by using the machine learning model. In other words, the machine learning model may be utilized whenever the first distortion is calculated. The first distortion may be determined with any suitable distortion matrix, including but not limited to: a sum of square error (SSE) matrix, a mean of square error (MSE) matrix, a structural similarity (SSIM) matrix, a multi-scale structural similarity (MS-SSIM) matrix, or an information content weighted SSIM (IW-SSIM) matrix.

Alternatively, in some embodiments, if a first distortion of the target video block is determined with a first matrix, the target coding tool may be determined without using the machine learning model. For example, the first matrix may be a sum of absolute difference (SAD) matrix or a sum of absolute transformed difference (SATD) matrix.

In some embodiments, at block 1602, a second distortion of the target video block is determined based at least in part on the machine learning model. The second distortion may comprise a cost of the target video block. The target coding tool may be determined based on the second distortion. In this way, the distortion or cost calculated in a coding tool decision process such as the RDO process may be revised so that the impact of NN filtering process can be taken into consideration.

In some embodiments, the second distortion is determined with any suitable distortion matrix, including but not limited to a sum of square error (SSE) matrix, a mean of square error (MSE) matrix, a structural similarity (SSIM) matrix, a multi-scale structural similarity (MS-SSIM) matrix, or an information content weighted SSIM (IW-SSIM) matrix.

In some embodiments, at block 1602, first filtered reconstruction samples of the target video block may be determined based on reconstruction samples of the target video block by using the machine learning model. The reconstruction samples are reconstructed without an in-loop filtering. The second distortion may be determined based on a third distortion between the first filtered reconstruction samples and original samples of the target video block.

In one example, the third distortion may be determined as the second distortion without using a fourth distortion between the reconstruction samples and the original samples of the target video block. In other words, instead of using the distortion calculated between the reconstruction before in-loop filtering methods (referred to as non-filtered reconstruction) and original samples, a NN filtering process may be applied to the reconstruction samples to get the NN-filtered reconstruction samples and calculate the distortion between the NN-filtered reconstruction samples and original samples.

Alternatively, in other embodiments, the second distortion may be determined based on the third distortion and a fourth distortion between the reconstruction samples and the original samples of the target video block. For example, a first metric of the third and fourth distortions may be determined as the second distortion. In other words, the first metric or function of the two distortions may be invoked and the output of the function is set to the real distortion associated with the current coding mode to be checked during the RDO process.

In some embodiments, at least one set of filtered reconstruction samples of the target video block may be determined based on a set of reconstruction samples of the target video block by using at least one filtering model. A fifth distortion between the set of reconstruction samples and a set of original samples of the target video block is determined. At least one distortion between the at least one set of filtered reconstruction samples and the set of original samples of the target video block is determined. The second distortion may be determined based on the fifth distortion and the at least one distortion. That is, multiple distortions are calculated. One is between non-filtered reconstruction and original samples. Others are between filtered reconstruction and original samples.

In some embodiments, the at least one filtering model comprises the machine learning model. Alternatively, or in addition, in some embodiments, the at least one filtering model comprises a further model different from the machine learning model. That is, the filtered reconstruction samples may be filtered by the machine learning model and/or the further model.

In some embodiments, a second metric of the fifth distortion and the at least one distortion may be determined as the second distortion. The second metric may comprise a function of the at least one and the fifth distortions.

Alternatively, or in addition, in some embodiments, second filtered reconstruction samples of the target video block may be determined based on reconstruction samples of the target video block by using a further model different from the machine learning model. Third filtered reconstruction samples of the target video block may be determined based on the second filtered reconstruction samples by using the machine learning model determining. A sixth distortion between the second filtered reconstruction samples and original samples of the target video block is determined. A seventh distortion between the third filtered reconstruction samples and the original sample is determined. The second distortion may be determined based on the sixth and seventh distortions. In some embodiments, a third metric of the sixth and seventh distortions may be determined as the second distortion.

In some embodiments, the further model may be any suitable model, including but not limited to: a convolutional neural network (CNN) model, a deblocking filter, a sample adaptive offset (SAO) filter, an adaptive loop filter (ALF), a cross-component SAO (CCSAO) filter, or a cross-component ALF (CCALF). In some embodiments, the further model is applied to the reconstruction samples before the machine learning model.

In some embodiments, a fourth distortion between reconstruction samples and original samples of the target video block is determined. The second distortion may be determined based on the fourth distortion and a factor. For example, the factor may be a constant in a predetermined range, such as a range between 0 and 1.0.

Alternatively, or in addition, in some embodiments, the factor may be determined based on at least one of the following: a current mode determined during the determination of the target coding tool, a lambda factor in a metric for the second distortion, or a color component. It is to be understood that the factor may be determined based on any suitable rules or methods. Scope of the present disclosure is not limited in this regard.

In some embodiments, a filtering process is applied to reconstruction samples of the target video block by using the machine learning model during the determination of the target coding tool. For example, the filtering process may be different from an in-loop filtering process or a post-processing process applied to the target video block.

In some embodiments, the machine learning model used in the filtering process is different from a further filtering model used in the in-loop filtering process or the post-processing process.

In some embodiments, a first number of machine learning models used in the filtering process is different from a second number of further filtering models used in the in-loop filtering process or the post-processing process.

Alternatively, or in addition, in some embodiments, a first network structure of the machine learning model is different from a second network structure of the further filtering model. For example, boundary strength (BS) information for network of the machine learning model may be removed, while BS information of the further filtering model will be remained.

In some embodiments, the filtering process is applied to a sub-region of the target video block. For example, the sub-region of the target video block comprises at least one of: boundary samples of the target video block, or inner samples of the target video block.

Alternatively, or in addition, in some embodiments, the filtering process is applied to a down-sampled version of the target video block.

In some embodiments, the machine learning model is the same as a further machine learning model obtained by a decoder used during the conversion. For example, a first number of residual blocks of the machine learning model is the same as a second number of residual blocks of the further machine learning model.

Alternatively, in some embodiments, the machine learning model is different from a further machine learning model obtained by a decoder used during the conversion. For example, the machine learning model may be simpler than the further machine learning model.

In some embodiments, a first depth of the machine learning model is different from a second depth of the further machine learning model. For example, the first depth may be shallower than the second depth.

In some embodiments, a first feature map of the machine learning model is different from a second feature map of the further machine learning model. In one example, a first number of feature maps of the machine learning model is less than a second number of feature maps of the further machine learning model.

In some embodiments, a first number of residual blocks (ResBlock) of the machine learning model is different from a second number of residual blocks of the further machine learning model. For example, the first number of residual blocks of the machine learning model may be less than the second number of residual blocks of the further machine learning model. The first number of residual blocks may be 1, 2, 3, 4, 5 or 6. The second number of residual blocks may be 8.

In some embodiments, a first convolution kernel of the machine learning model is different from a second convolutional kernel of the further machine learning model.

In some embodiments, second information regarding the machine learning model may be determined based on coding information of the target video block. The second information may comprise whether to use the machine learning model in the determination of the target coding tool, and/or how to use the machine learning model in the determination of the target coding tool.

As described above, the coding information may comprise a coding mode of the target video block, and/or coding statistics of the target video block. The coding information may be any suitable coding modes or statistics of the video block or unit, including but not limited to a prediction mode of the target video block, a quantization parameter (QP) of the target video block, a temporal layer of the target video block, or a slice type of the target video block.

Further examples of the coding information may include a quantization step in the conversion, a temporal layer in the conversion, a slice type of the target video block, a block size of the target video block, a color component of the target video block, or a rate distortion cost of the target video block without using the machine learning model. For example, the second information may be determined based on whether the block size is larger than a threshold size such as 64×64. For another example, the second information may be determined based on the number of color components. If only one color component is used, then the second information may indicate to use the machine learning model in the determination of coding tool.

It is to be understood that the example coding information is only for the purpose of illustration, without suggesting any limitation. Scope of the present disclosure is not limited in the regard.

In some embodiments, a bitstream of a video may be stored in a non-transitory computer-readable recording medium. The bitstream of the video can be generated by a method performed by a video processing apparatus. According to the method, a target coding tool for a target video block of the video may be determined by using a machine learning model. The bitstream may be generated by using the target coding tool.

In some embodiments, a target coding tool for a target video block of the video may be determined by using a machine learning model. The bitstream may be generated by using the target coding tool. The bitstream may be stored in a non-transitory computer-readable recording medium.

According to embodiments of the present disclosure, the machine learning model may be taken into consideration in selection of the coding tool or coding mode. In this way, a proper coding tool may be selected, and thus the coding effectiveness and coding efficiency may be improved.

Implementations of the present disclosure can be described in view of the following clauses, the features of which can be combined in any reasonable manner.

Clause 1. A method for video processing, comprising: determining, during a conversion between a target video block of a video and a bitstream of the video, a target coding tool for the target video block by using a machine learning model; and performing the conversion by using the target coding tool.

Clause 2. The method of clause 1, wherein the machine learning model is used for neural network (NN) filtering during the determination of the target coding tool.

Clause 3. The method of clause 1 or clause 2, wherein the machine learning model is obtained by an encoder used during the conversion.

Clause 4. The method of any of clauses 1-3, wherein determining the target coding tool comprises: applying the machine learning model in a rate-distortion optimization (RDO) process on the target video block to obtain the target coding tool.

Clause 5. The method of any of clauses 1-4, wherein the machine learning model is not obtained by a decoder used during the conversion.

Clause 6. The method of any of clauses 1-5, wherein the machine learning model comprises at least one of: a neural network (NN) model, a convolutional neural network (CNN) model, or a non-NN based model.

Clause 7. The method of any of clauses 1-6, wherein a further model different from the machine learning model is obtained by an encoder used during the conversion.

Clause 8. The method of clause 7, wherein the machine learning model is combined with the further model.

Clause 9. The method of clause 7, wherein the machine learning model is applied before or after the further model.

Clause 10. The method of any of clauses 7-9, wherein the further model comprises at least one of: a convolutional neural network (CNN) model, a deblocking filter, a sample adaptive offset (SAO) filter, an adaptive loop filter (ALF), a cross-component SAO (CCSAO) filter, or a cross-component ALF (CCALF).

Clause 11. The method of any of clauses 7-10, further comprising: applying, based on a filtering order, at least one of the machine learning model or the further model to the target video block.

Clause 12. The method of clause 11, wherein the filtering order comprises an order as follows: a deblocking filter, a convolutional neural network (CNN) filter, a sample adaptive offset (SAO) filter, and an adaptive loop filter (ALF).

Clause 13. The method of clause 11 or clause 12, wherein the filtering order is predefined.

Clause 14. The method of clause 11 or clause 12, further comprising: determining the filtering order based on coding information of the target video block.

Clause 15. The method of any of clauses 7-14, further comprising: determining, based on coding information of the target video block, first information regarding a utilization of at least one of the machine learning model or the further model.

Clause 16. The method of clause 15, wherein the first information comprises at least one of the following: whether to use the at least one of the machine learning model or the further model, or how to use the at least one of the machine learning model or the further model.

Clause 17. The method of any of clauses 14-16, wherein the coding information comprises at least one of: a coding mode of the target video block, or coding statistics of the target video block.

Clause 18. The method of any of clauses 14-17, wherein the coding information comprises at least one of: a prediction mode of the target video block, a quantization parameter (QP) of the target video block, a temporal layer of the target video block, or a slice type of the target video block.

Clause 19. The method of any of clauses 1-18, wherein determining the target coding tool comprises: determining filtered reconstruction information of the target video block by using the machine learning model; and determining the target coding tool based on the filtered reconstruction information.

Clause 20. The method of any of clauses 1-19, wherein determining the target coding tool by using the machine learning model comprises at least one of: determining a target intra mode by using the machine learning model; determining a target coded intra tool by using the machine learning model; determining a target inter mode by using the machine learning model; determining a target coded inter tool by using the machine learning model; determining a target partitioning mode by using the machine learning model; determining a target transform core by using the machine learning model; or determining a target coded tool by using the machine learning model.

Clause 21. The method of clause 20, wherein determining the target coded intra tool comprises: determining the target coded intra tool from a mixed based intra prediction (MIP) tool, an intra sub partition (ISP) tool or a multiple reference line (MRL) tool.

Clause 22. The method of clause 20, wherein determining the target inter mode comprises: determining the target inter mode from an advanced motion vector predication (AMVP) mode, a skip mode or a merge mode.

Clause 23. The method of clause 20, wherein determining the target coded inter tool comprises: determining the target coded inter tool from the following: an affine motion mode, a translation motion mode, a merge with motion vector difference (MMVD) tool, a combine intra and inter prediction (CIIP) tool, or a geometric partitioning mode (GPM).

Clause 24. The method of clause 20, wherein determining the target partitioning mode comprises: determining the target partitioning mode from a quad-tree (QT) partitioning mode, a binary-tree (BT) partitioning mode, a ternary-tree (TT) partitioning mode, or a non-split mode.

Clause 25. The method of clause 20, wherein determining the target coded tool comprises: determining the target coded tool from an intra tool or an inter tool.

Clause 26. The method of clause 25, wherein: the intra tool comprises at least one of a mixed based intra prediction (MIP) tool or an intra sub partition (ISP) tool, and the inter tool comprises at least one of a merge with motion vector difference (MMVD) tool, an advanced motion vector predication (AMVP) tool or a skip mode.

Clause 27. The method of any of clauses 1-26, wherein determining the target coding tool comprises: in accordance with a determination that a first distortion of the target video block is determined, determining the target coding tool by using the machine learning model.

Clause 28. The method of clause 27, wherein the first distortion is determined with one of the following: a sum of square error (SSE) matrix, a mean of square error (MSE) matrix, a structural similarity (SSIM) matrix, a multi-scale structural similarity (MS-SSIM) matrix, or an information content weighted SSIM (IW-SSIM) matrix.

Clause 29. The method of any of clauses 1-26, further comprising: in accordance with a determination that a first distortion of the target video block is determined with a first matrix, determining the target coding tool without using the machine learning model.

Clause 30. The method of clause 29, wherein the first matrix comprises a sum of absolute difference (SAD) matrix or a sum of absolute transformed difference (SATD) matrix.

Clause 31. The method of any of clauses 1-30, wherein determining the target coding tool by using the machine learning model comprises: determining a second distortion of the target video block based at least in part on the machine learning model; and determining the target coding tool based on the second distortion.

Clause 32. The method of clause 31, wherein the second distortion comprises a cost of the target video block.

Clause 33. The method of clause 31 or clause 32, wherein the second distortion is determined with one of the following: a sum of square error (SSE) matrix, a mean of square error (MSE) matrix, a structural similarity (SSIM) matrix, a multi-scale structural similarity (MS-SSIM) matrix, or an information content weighted SSIM (IW-SSIM) matrix.

Clause 34. The method of any of clauses 31-33, wherein determining the second distortion comprises: determining, based on reconstruction samples of the target video block, first filtered reconstruction samples of the target video block by using the machine learning model, the reconstruction samples being reconstructed without an in-loop filtering; and determining the second distortion based on a third distortion between the first filtered reconstruction samples and original samples of the target video block.

Clause 35. The method of clause 34, wherein determining the second distortion based on the third distortion comprises: determining the third distortion as the second distortion without using a fourth distortion between the reconstruction samples and the original samples of the target video block.

Clause 36. The method of clause 34, wherein determining the second distortion based on the third distortion comprises: determining the second distortion based on the third distortion and a fourth distortion between the reconstruction samples and the original samples of the target video block.

Clause 37. The method of clause 36, wherein determining the second distortion based on the third and fourth distortions comprises: determining a first metric of the third and fourth distortions as the second distortion.

Clause 38. The method of any of clauses 31-33, wherein determining the second distortion comprises: determining, based on a set of reconstruction samples of the target video block, at least one set of filtered reconstruction samples of the target video block by using at least one filtering model; determining a fifth distortion between the set of reconstruction samples and a set of original samples of the target video block; determining at least one distortion between the at least one set of filtered reconstruction samples and the set of original samples of the target video block; and determining the second distortion based on the fifth distortion and the at least one distortion.

Clause 39. The method of clause 38, wherein the at least one filtering model comprises at least one of: the machine learning model, or a further model different from the machine learning model.

Clause 40. The method of clause 38 or clause 39, wherein determining the second distortion based on the fifth distortion and the at least one distortion comprises: determining a second metric of the fifth distortion and the at least one distortion as the second distortion.

Clause 41. The method of any of clauses 31-33, wherein determining the second distortion comprises: determining, based on reconstruction samples of the target video block, second filtered reconstruction samples of the target video block by using a further model different from the machine learning model; determining, based on the second filtered reconstruction samples, third filtered reconstruction samples of the target video block by using the machine learning model; determining a sixth distortion between the second filtered reconstruction samples and original samples of the target video block; determining a seventh distortion between the third filtered reconstruction samples and the original samples; and determining the second distortion based on the sixth and seventh distortions.

Clause 42. The method of clause 39 or clause 41, wherein the further model comprises at least one of: a convolutional neural network (CNN) model, a deblocking filter, a sample adaptive offset (SAO) filter, an adaptive loop filter (ALF), a cross-component SAO (CCSAO) filter, or a cross-component ALF (CCALF).

Clause 43. The method of clause 41, wherein the further model is applied to the reconstruction samples before the machine learning model.

Clause 44. The method of clause 41 or clause 43, wherein determining the second distortion based on the sixth and seventh distortions comprises: determining a third metric of the sixth and seventh distortions as the second distortion.

Clause 45. The method of any of clauses 31-33, wherein determining the second distortion comprises: determining a fourth distortion between reconstruction samples and original samples of the target video block; and determining the second distortion based on the fourth distortion and a factor.

Clause 46. The method of clause 45, wherein the factor comprises a constant in a predetermined range.

Clause 47. The method of clause 46, wherein the predetermined range comprises a range between 0 and 1.0.

Clause 48. The method of clause 45, further comprising: determining the factor based on at least one of the following: a current mode determined during the determination of the target coding tool, a lambda factor in a metric for the second distortion, or a color component.

Clause 49. The method of any of clauses 1-48, wherein a filtering process is applied to reconstruction samples of the target video block by using the machine learning model during the determination of the target coding tool.

Clause 50. The method of clause 49, wherein the filtering process is different from an in-loop filtering process or a post-processing process applied to the target video block.

Clause 51. The method of clause 50, wherein the machine learning model used in the filtering process is different from a further filtering model used in the in-loop filtering process or the post-processing process.

Clause 52. The method of clause 51, wherein a first number of machine learning models used in the filtering process is different from a second number of further filtering models used in the in-loop filtering process or the post-processing process.

Clause 53. The method of clause 51 or clause 52, wherein a first network structure of the machine learning model is different from a second network structure of the further filtering model.

Clause 54. The method of any of clauses 49-53, wherein the filtering process is applied to a sub-region of the target video block.

Clause 55. The method of clause 54, wherein the sub-region of the target video block comprises at least one of: boundary samples of the target video block, or inner samples of the target video block.

Clause 56. The method of any of clauses 49-55, wherein the filtering process is applied to a down-sampled version of the target video block.

Clause 57. The method of any of clauses 1-56, wherein the machine learning model is the same as a further machine learning model obtained by a decoder used during the conversion.

Clause 58. The method of clause 57, wherein a first number of residual blocks of the machine learning model is the same as a second number of residual blocks of the further machine learning model.

Clause 59. The method of any of clauses 1-56, wherein the machine learning model is different from a further machine learning model obtained by a decoder used during the conversion.

Clause 60. The method of clause 59, wherein the machine learning model is simpler than the further machine learning model.

Clause 61. The method of clause 59 or clause 60, wherein a first depth of the machine learning model is different from a second depth of the further machine learning model.

Clause 62. The method of clause 61, wherein the first depth is shallower than the second depth.

Clause 63. The method of any of clauses 59-62, wherein a first feature map of the machine learning model is different from a second feature map of the further machine learning model.

Clause 64. The method of any of clauses 59-63, wherein a first number of feature maps of the machine learning model is less than a second number of feature maps of the further machine learning model.

Clause 65. The method of any of clauses 59-64, wherein a first number of residual blocks of the machine learning model is different from a second number of residual blocks of the further machine learning model.

Clause 66. The method of clause 65, wherein the first number of residual blocks of the machine learning model is less than the second number of residual blocks of the further machine learning model.

Clause 67. The method of clause 65 or clause 66, wherein the first number of residual blocks comprises one of: 1, 2, 3, 4, 5 or 6.

Clause 68. The method of any of clauses 59-67, wherein a first convolution kernel of the machine learning model is different from a second convolutional kernel of the further machine learning model.

Clause 69. The method of any of clauses 1-68, further comprising: determining second information regarding the machine learning model based on coding information of the target video block.

Clause 70. The method of clause 69, wherein the second information comprises at least one of the following: whether to use the machine learning model in the determination of the target coding tool, or how to use the machine learning model in the determination of the target coding tool.

Clause 71. The method of clause 69 or clause 70, wherein the coding information comprises at least one of: a coding mode of the target video block, or coding statistics of the target video block.

Clause 72. The method of any of clauses 69-71, wherein the coding information comprises at least one of: a prediction mode of the target video block, a quantization parameter (QP) of the target video block, a temporal layer of the target video block, or a slice type of the target video block.

Clause 73. The method of any of clauses 69-72, wherein the coding information comprises at least one of: a quantization step in the conversion, a temporal layer in the conversion, a slice type of the target video block, a block size of the target video block, a color component of the target video block, or a rate distortion cost of the target video block without using the machine learning model.

Clause 74. The method of any of clauses 1-73, wherein the conversion includes encoding the target video block into the bitstream.

Clause 75. The method of any of clauses 1-73, wherein the conversion includes decoding the target video block from the bitstream.

Clause 76. An apparatus for processing video data comprising a processor and a non-transitory memory with instructions thereon, wherein the instructions upon execution by the processor, cause the processor to perform a method in accordance with any of clauses 1-75.

Clause 77. A non-transitory computer-readable storage medium storing instructions that cause a processor to perform a method in accordance with any of clauses 1-75.

Clause 78. A non-transitory computer-readable recording medium storing a bitstream of a video which is generated by a method performed by a video processing apparatus, wherein the method comprises: determining, by using a machine learning model, a target coding tool for a target video block of the video; and generating the bitstream by using the target coding tool.

Clause 79. A method for storing a bitstream of a video, comprising: determining, by using a machine learning model, a target coding tool for a target video block of the video; generating the bitstream by using the target coding tool; and storing the bitstream in a non-transitory computer-readable recording medium.

Example Device

Figure 17:
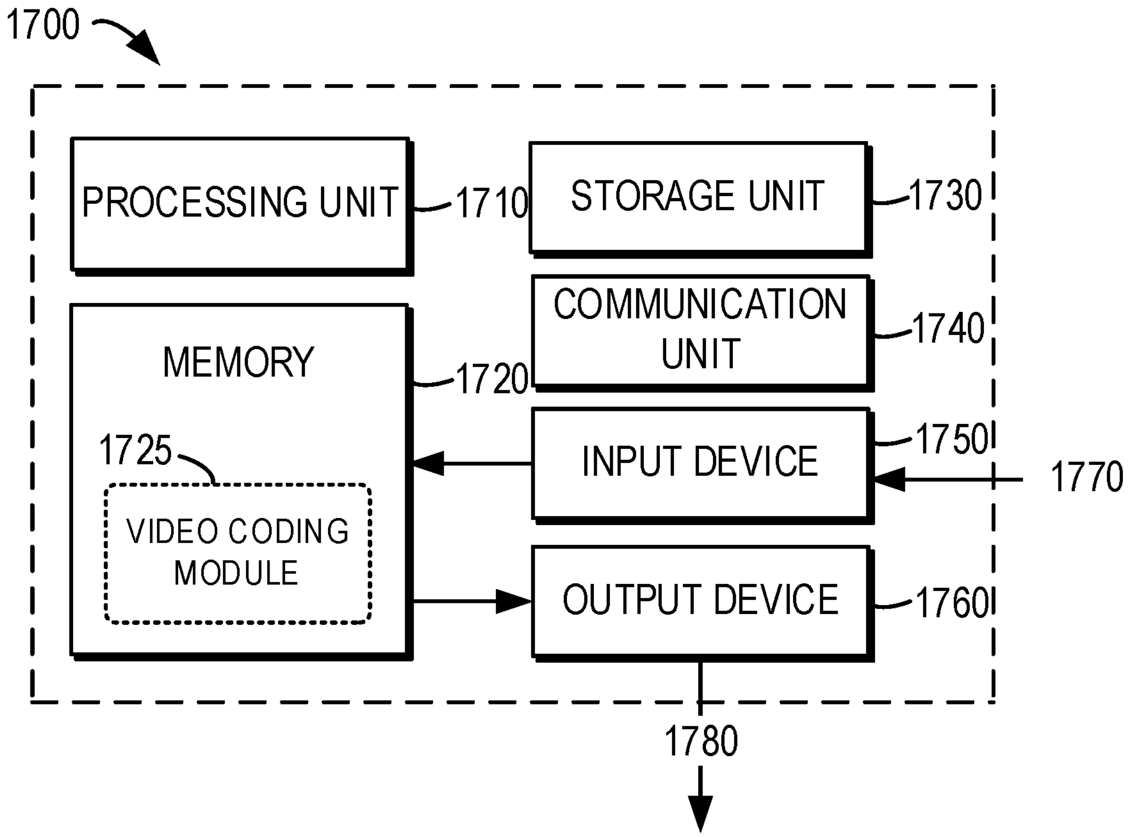
FIG. 17 illustrates a block diagram of a computing device in which various embodiments of the present disclosure can be implemented.

FIG. 17 illustrates a block diagram of a computing device 1700 in which various embodiments of the present disclosure can be implemented. The computing device 1700 may be implemented as or included in the source device 110 (or the video encoder 114 or 200) or the destination device 120 (or the video decoder 124 or 300).

It would be appreciated that the computing device 1700 shown in FIG. 17 is merely for purpose of illustration, without suggesting any limitation to the functions and scopes of the embodiments of the present disclosure in any manner.

As shown in FIG. 17, the computing device 1700 includes a general-purpose computing device 1700. The computing device 1700 may at least comprise one or more processors or processing units 1710, a memory 1720, a storage unit 1730, one or more communication units 1740, one or more input devices 1750, and one or more output devices 1760.

In some embodiments, the computing device 1700 may be implemented as any user terminal or server terminal having the computing capability. The server terminal may be a server, a large-scale computing device or the like that is provided by a service provider. The user terminal may for example be any type of mobile terminal, fixed terminal, or portable terminal, including a mobile phone, station, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/video player, digital camera/video camera, positioning device, television receiver, radio broadcast receiver, E-book device, gaming device, or any combination thereof, including the accessories and peripherals of these devices, or any combination thereof. It would be contemplated that the computing device 1700 can support any type of interface to a user (such as "wearable" circuitry and the like).

The processing unit 1710 may be a physical or virtual processor and can implement various processes based on programs stored in the memory 1720. In a multi-processor system, multiple processing units execute computer executable instructions in parallel so as to improve the parallel processing capability of the computing device 1700. The processing unit 1710 may also be referred to as a central processing unit (CPU), a microprocessor, a controller or a microcontroller.

The computing device 1700 typically includes various computer storage medium. Such medium can be any medium accessible by the computing device 1700, including, but not limited to, volatile and non-volatile medium, or detachable and non-detachable medium. The memory 1720 can be a volatile memory (for example, a register, cache, Random Access Memory (RAM)), a non-volatile memory (such as a Read-Only Memory (ROM), Electrically Erasable Programmable Read-Only Memory (EEPROM), or a flash memory), or any combination thereof. The storage unit 1730 may be any detachable or non-detachable medium and may include a machine-readable medium such as a memory, flash memory drive, magnetic disk or another other media, which can be used for storing information and/or data and can be accessed in the computing device 1700.

The computing device 1700 may further include additional detachable/non-detachable, volatile/non-volatile memory medium. Although not shown in FIG. 17, it is possible to provide a magnetic disk drive for reading from and/or writing into a detachable and non-volatile magnetic disk and an optical disk drive for reading from and/or writing into a detachable non-volatile optical disk. In such cases, each drive may be connected to a bus (not shown) via one or more data medium interfaces.

The communication unit 1740 communicates with a further computing device via the communication medium. In addition, the functions of the components in the computing device 1700 can be implemented by a single computing cluster or multiple computing machines that can communicate via communication connections. Therefore, the computing device 1700 can operate in a networked environment using a logical connection with one or more other servers, networked personal computers (PCs) or further general network nodes.

The input device 1750 may be one or more of a variety of input devices, such as a mouse, keyboard, tracking ball, voice-input device, and the like. The output device 1760 may be one or more of a variety of output devices, such as a display, loudspeaker, printer, and the like. By means of the communication unit 1740, the computing device 1700 can further communicate with one or more external devices (not shown) such as the storage devices and display device, with one or more devices enabling the user to interact with the computing device 1700, or any devices (such as a network card, a modem and the like) enabling the computing device 1700 to communicate with one or more other computing devices, if required. Such communication can be performed via input/output (I/O) interfaces (not shown).

In some embodiments, instead of being integrated in a single device, some or all components of the computing device 1700 may also be arranged in cloud computing architecture. In the cloud computing architecture, the components may be provided remotely and work together to implement the functionalities described in the present disclosure. In some embodiments, cloud computing provides computing, software, data access and storage service, which will not require end users to be aware of the physical locations or configurations of the systems or hardware providing these services. In various embodiments, the cloud computing provides the services via a wide area network (such as Internet) using suitable protocols. For example, a cloud computing provider provides applications over the wide area network, which can be accessed through a web browser or any other computing components. The software or components of the cloud computing architecture and corresponding data may be stored on a server at a remote position. The computing resources in the cloud computing environment may be merged or distributed at locations in a remote data center. Cloud computing infrastructures may provide the services through a shared data center, though they behave as a single access point for the users. Therefore, the cloud computing architectures may be used to provide the components and functionalities described herein from a service provider at a remote location. Alternatively, they may be provided from a conventional server or installed directly or otherwise on a client device.

The computing device 1700 may be used to implement video encoding/decoding in embodiments of the present disclosure. The memory 1720 may include one or more video coding modules 1725 having one or more program instructions. These modules are accessible and executable by the processing unit 1710 to perform the functionalities of the various embodiments described herein.

In the example embodiments of performing video encoding, the input device 1750 may receive video data as an input 1770 to be encoded. The video data may be processed, for example, by the video coding module 1725, to generate an encoded bitstream. The encoded bitstream may be provided via the output device 1760 as an output 1780.

In the example embodiments of performing video decoding, the input device 1750 may receive an encoded bitstream as the input 1770. The encoded bitstream may be processed, for example, by the video coding module 1725, to generate decoded video data. The decoded video data may be provided via the output device 1760 as the output 1780.

While this disclosure has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting.

We claim:

1. A method for video processing, comprising:

determining, during a conversion between a target video block of a video and a bitstream of the video, a target coding tool for the target video block by using a machine learning model; and performing the conversion by using the target coding tool, wherein determining the target coding tool by using the machine learning model comprises:

determining, based on reconstruction samples of the target video block, first filtered reconstruction samples of the target video block by using the machine learning model;

determining a first distortion between the first filtered reconstruction samples and original samples of the target video block;

determining a cost of the target video block based on the first distortion and a distortion between the reconstruction samples and the original samples of the target video block; and determining the target coding tool based on the cost.

2. The method of claim 1, wherein the machine learning model is used for neural network (NN) filtering during the determination of the target coding tool, wherein the machine learning model is obtained by an encoder used during the conversion, wherein determining the target coding tool comprises: applying the machine learning model in a rate-distortion optimization (RDO) process on the target video block to obtain the target coding tool, wherein the machine learning model is not obtained by a decoder used during the conversion, or wherein the machine learning model comprises at least one of: a neural network (NN) model, a convolutional neural network (CNN) model, or a non-NN based model.

3. The method of claim 1, wherein a further model different from the machine learning model is obtained by an encoder used during the conversion, wherein the machine learning model is combined with the further model, wherein the further model comprises at least one of: a convolutional neural network (CNN) model, a deblocking filter, a sample adaptive offset (SAO) filter, an adaptive loop filter (ALF), a cross-component SAO (CCSAO) filter, or a cross-component ALF (CCALF).

4. The method of claim 3, further comprising:

applying, based on a filtering order, at least one of the machine learning model or the further model to the target video block, wherein the filtering order comprises an order as follows: a deblocking filter, a convolutional neural network (CNN) filter, a sample adaptive offset (SAO) filter, and an adaptive loop filter (ALF), wherein the filtering order is predefined.

5. The method of claim 1, wherein determining the target coding tool comprises:

determining filtered reconstruction information of the target video block by using the machine learning model; and determining the target coding tool based on the filtered reconstruction information.

6. The method of claim 1, wherein determining the target coding tool by using the machine learning model comprises at least one of:

determining a target intra mode by using the machine learning model;

determining a target coded intra tool by using the machine learning model;

determining a target inter mode by using the machine learning model;

determining a target coded inter tool by using the machine learning model;

determining a target partitioning mode by using the machine learning model;

determining a target transform core by using the machine learning model; or determining a target coded tool by using the machine learning model, wherein determining the target partitioning mode comprises: determining the target partitioning mode from a quad-tree (QT) partitioning mode, a binary-tree (BT) partitioning mode, a ternary-tree (TT) partitioning mode, or a non-split mode.

7. The method of claim 1, wherein the first distortion is determined based on one of: a sum of square error (SSE) matrix, a mean of square error (MSE) matrix, a structural similarity (SSIM) matrix, a multi-scale structural similarity (MS-SSIM) matrix, or an information content weighted SSIM (IW-SSIM) matrix.

8. The method of claim 1, wherein the reconstruction samples of the target video block are reconstructed without an in-loop filtering.

9. The method of claim 1, wherein the cost of the target video block is determined based on the first distortion without using the distortion between the reconstruction samples and the original samples of the target video block.

10. The method of claim 7, wherein the cost of the target video block is determined by:

determining, based on a set of reconstruction samples of the target video block, at least one set of filtered reconstruction samples of the target video block by using at least one filtering model;

determining a fifth distortion between the set of reconstruction samples and a set of original samples of the target video block;

determining at least one distortion between the at least one set of filtered reconstruction samples and the set of original samples of the target video block, the at least one distortion comprising the first distortion; and determining the cost based on the fifth distortion and the at least one distortion, wherein the at least one filtering model comprises at least one of: the machine learning model, or a further model different from the machine learning model, or wherein determining the cost based on the fifth distortion and the at least one distortion comprises: determining a second metric of the fifth distortion and the at least one distortion as the cost.

11. The method of claim 1, wherein a filtering process is applied to reconstruction samples of the target video block by using the machine learning model during the determination of the target coding tool, wherein the filtering process is different from an in-loop filtering process or a post-processing process applied to the target video block, wherein the machine learning model used in the filtering process is different from a further filtering model used in the in-loop filtering process or the post-processing process, wherein a first number of machine learning models used in the filtering process is different from a second number of further filtering models used in the in-loop filtering process or the post-processing process, wherein a first network structure of the machine learning model is different from a second network structure of the further filtering model, wherein the filtering process is applied to a sub-region of the target video block, wherein the sub-region of the target video block comprises at least one of: boundary samples of the target video block, or inner samples of the target video block, or wherein the filtering process is applied to a down-sampled version of the target video block.

12. The method of claim 1, wherein the machine learning model is the same as a further machine learning model obtained by a decoder used during the conversion, wherein a first number of residual blocks of the machine learning model is the same as a second number of residual blocks of the further machine learning model.

13. The method of claim 1, wherein the machine learning model is different from a further machine learning model obtained by a decoder used during the conversion, wherein the machine learning model is simpler than the further machine learning model, or wherein a first depth of the machine learning model is different from a second depth of the further machine learning model, or wherein the first depth is shallower than the second depth, or wherein a first feature map of the machine learning model is different from a second feature map of the further machine learning model, or wherein a first number of feature maps of the machine learning model is less than a second number of feature maps of the further machine learning model, or wherein a first number of residual blocks of the machine learning model is different from a second number of residual blocks of the further machine learning model, or wherein the first number of residual blocks of the machine learning model is less than the second number of residual blocks of the further machine learning model, or wherein a first convolution kernel of the machine learning model is different from a second convolutional kernel of the further machine learning model.

14. The method of claim 1, further comprising:

determining second information regarding the machine learning model based on coding information of the target video block, or wherein the second information comprises at least one of:

whether to use the machine learning model in the determination of the target coding tool, or how to use the machine learning model in the determination of the target coding tool.

15. The method of claim 14, wherein the coding information comprises at least one of: a coding mode of the target video block, or coding statistics of the target video block, or wherein the coding information comprises at least one of: a prediction mode of the target video block, a quantization parameter (QP) of the target video block, a temporal layer of the target video block, or a slice type of the target video block, or wherein the coding information comprises at least one of: a quantization step in the conversion, a temporal layer in the conversion, a slice type of the target video block, a block size of the target video block, a color component of the target video block, or a rate distortion cost of the target video block without using the machine learning model.

16. The method of claim 1, wherein the conversion includes encoding the target video block into the bitstream.

17. The method of claim 1, wherein the conversion includes decoding the target video block from the bitstream.

18. An apparatus for processing video data comprising a processor and a non-transitory memory with instructions thereon, wherein the instructions upon execution by the processor, cause the processor to:

determine, during a conversion between a target video block of a video and a bitstream of the video, a target coding tool for the target video block by using a machine learning model; and perform the conversion by using the target coding tool, wherein determining the target coding tool by using the machine learning model comprises:

determining, based on reconstruction samples of the target video block, first filtered reconstruction samples of the target video block by using the machine learning model;

determining a first distortion between the first filtered reconstruction samples and original samples of the target video block;

determining a cost of the target video block based on the first distortion and a distortion between the reconstruction samples and the original samples of the target video block; and determining the target coding tool based on the cost.

19. A non-transitory computer-readable storage medium storing instructions that cause a processor to perform a method performed by a video processing apparatus, wherein the method comprises:

determining, during a conversion between a target video block of a video and a bitstream of the video, a target coding tool for the target video block by using a machine learning model; and performing the conversion by using the target coding tool, wherein determining the target coding tool by using the machine learning model comprises:

determining, based on reconstruction samples of the target video block, first filtered reconstruction samples of the target video block by using the machine learning model;

determining a first distortion between the first filtered reconstruction samples and original samples of the target video block;

determining a cost of the target video block based on the first distortion and a distortion between the reconstruction samples and the original samples of the target video block; and determining the target coding tool based on the cost.

20. A method for storing a bitstream of a video, comprising:

determining, by using a machine learning model, a target coding tool for a target video block of the video, generating the bitstream by using the target coding tool; and storing the bitstream in a non-transitory computer-readable recording medium, wherein determining the target coding tool by using the machine learning model comprises:

determining, based on reconstruction samples of the target video block, first filtered reconstruction samples of the target video block by using the machine learning model;

determining a first distortion between the first filtered reconstruction samples and original samples of the target video block;

determining a cost of the target video block based on the first distortion and a distortion between the reconstruction samples and the original samples of the target video block; and determining the target coding tool based on the cost.

* * * * *